Nov. 24, 1953        H. R. GULLIXSON ET AL        2,660,113
                      ROTARY OFFSET DUPLICATOR
Filed Nov. 27, 1946                              24 Sheets-Sheet 1
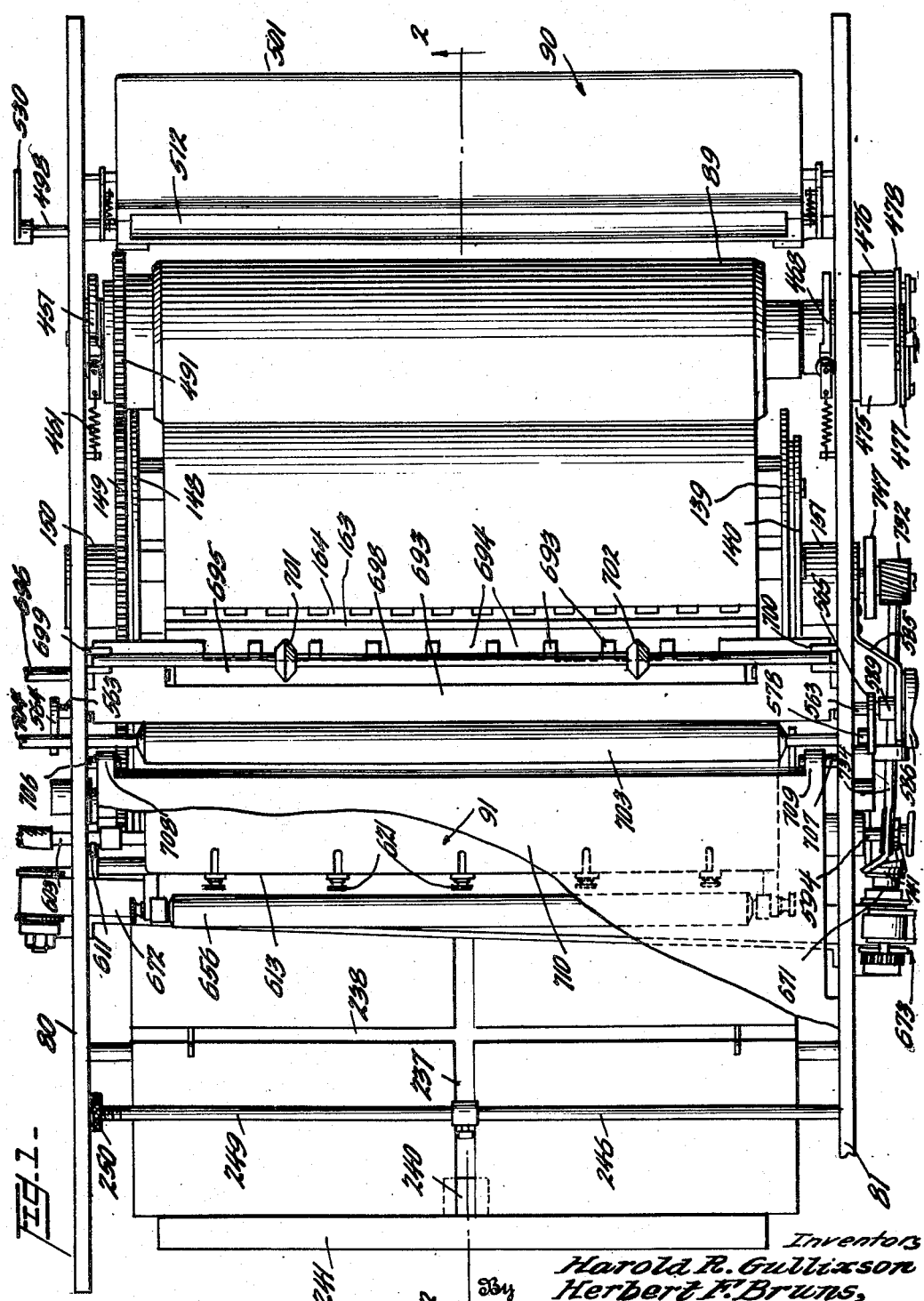
Inventors
Harold R. Gullixson
Herbert F. Bruns,
By
Attorneys

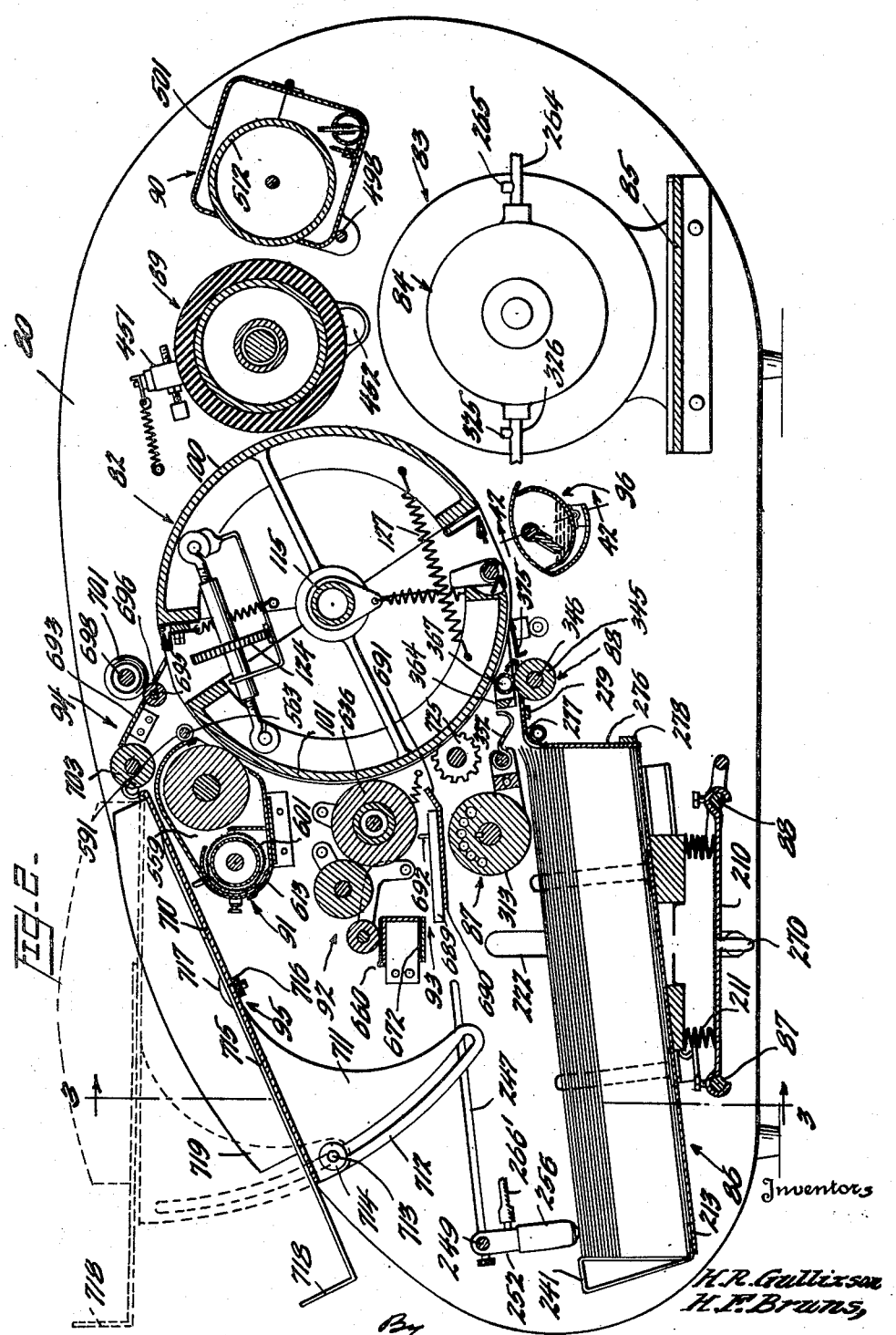

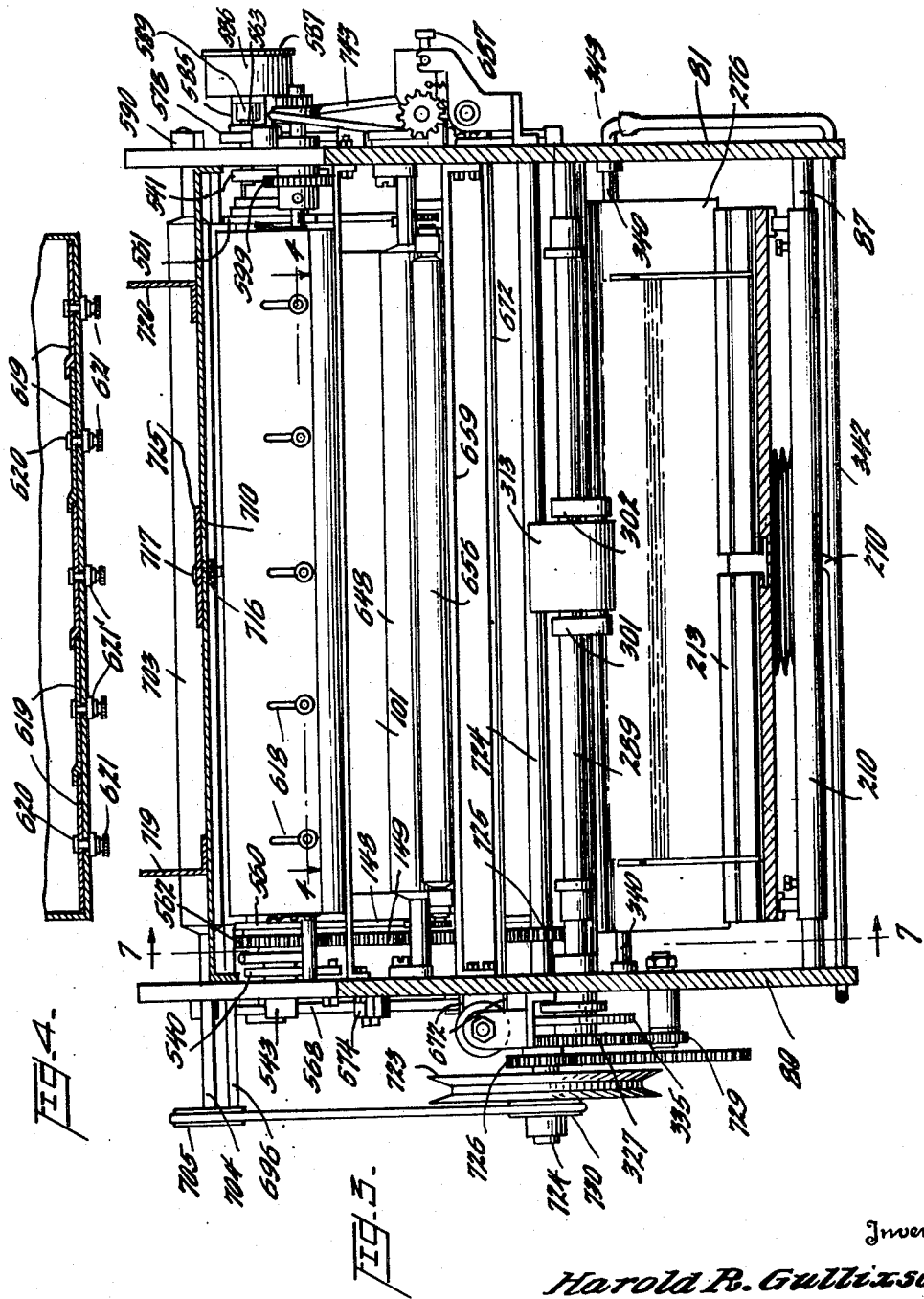

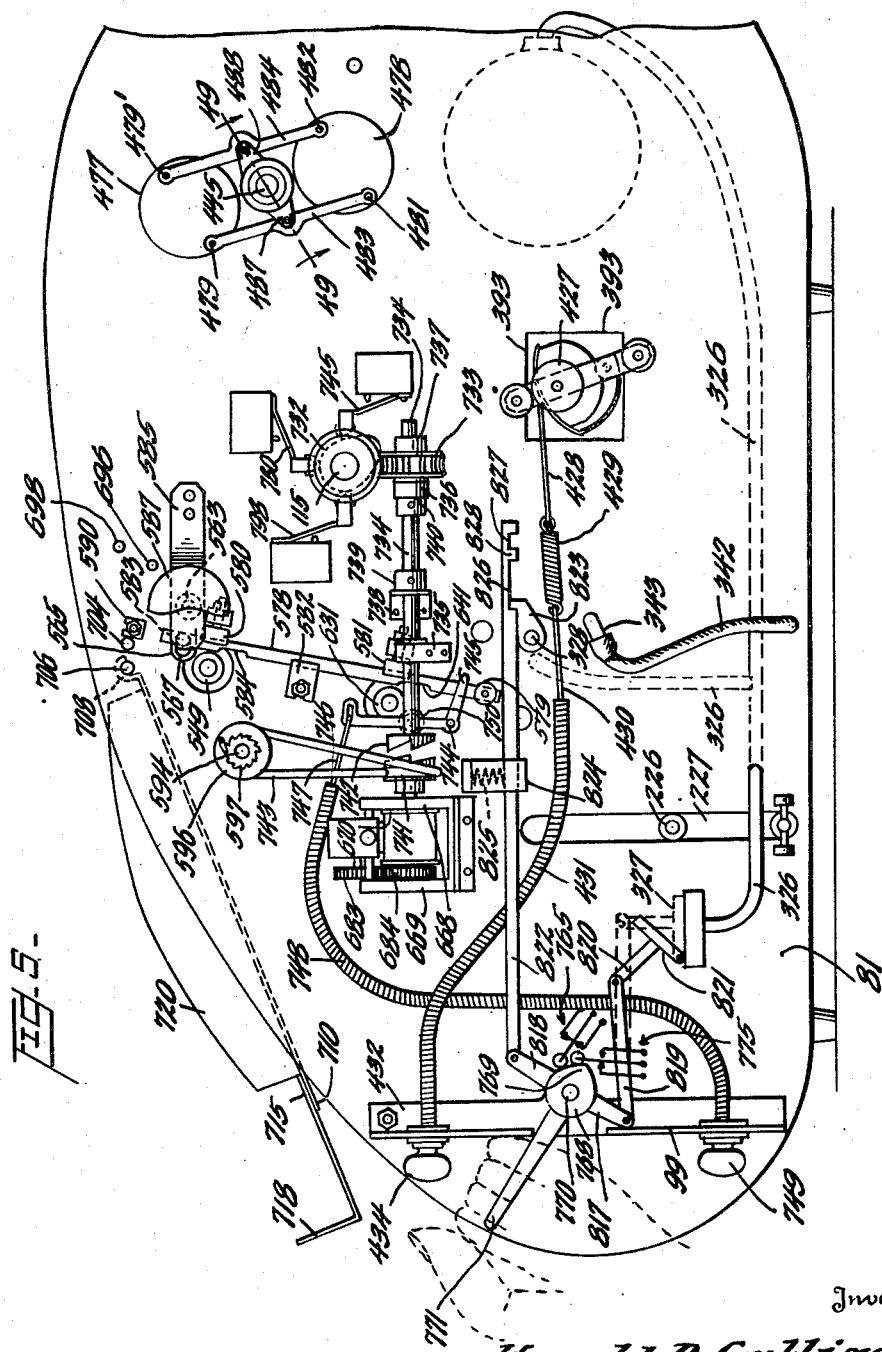

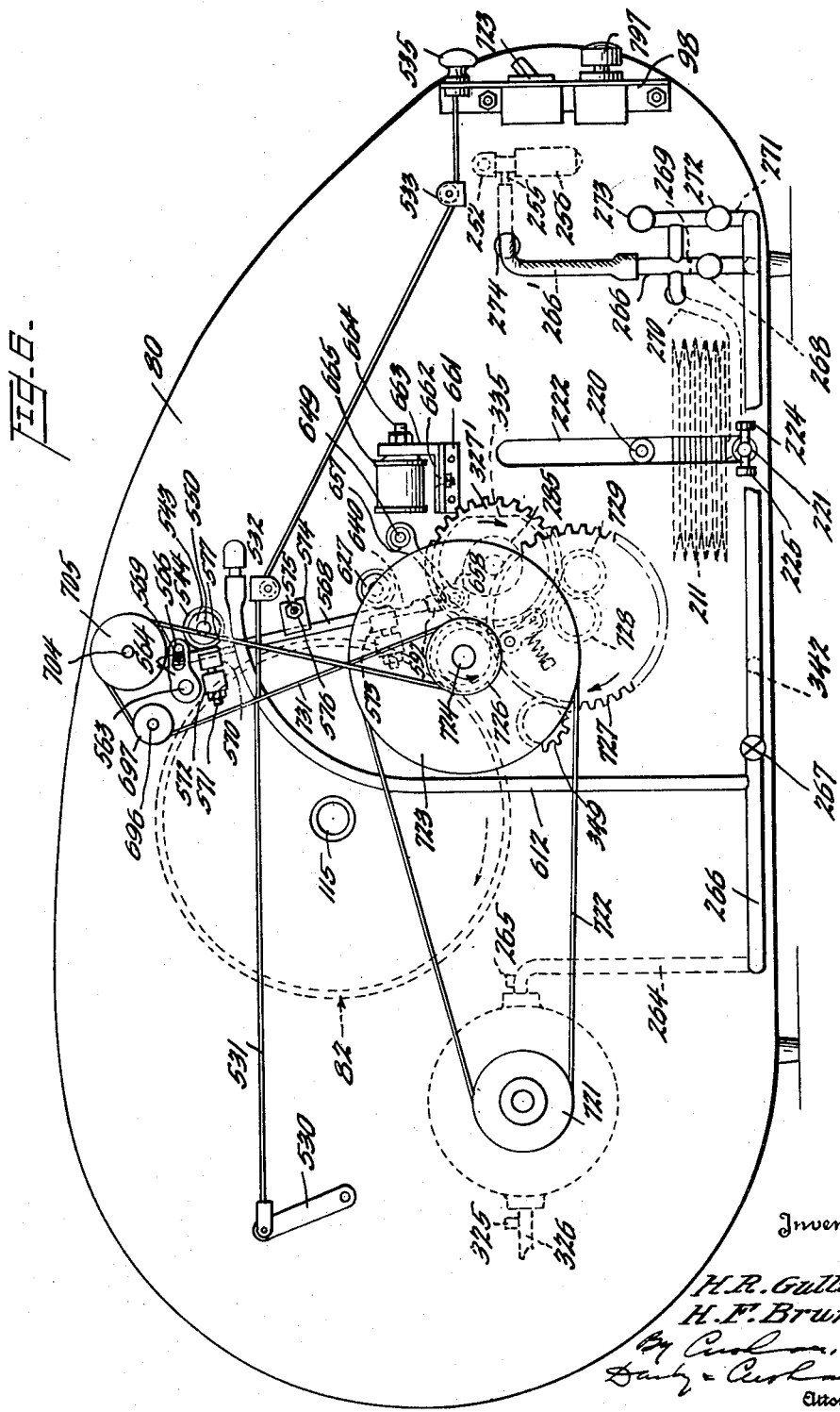

Nov. 24, 1953   H. R. GULLIXSON ET AL   2,660,113
ROTARY OFFSET DUPLICATOR
Filed Nov. 27, 1946   24 Sheets-Sheet 6
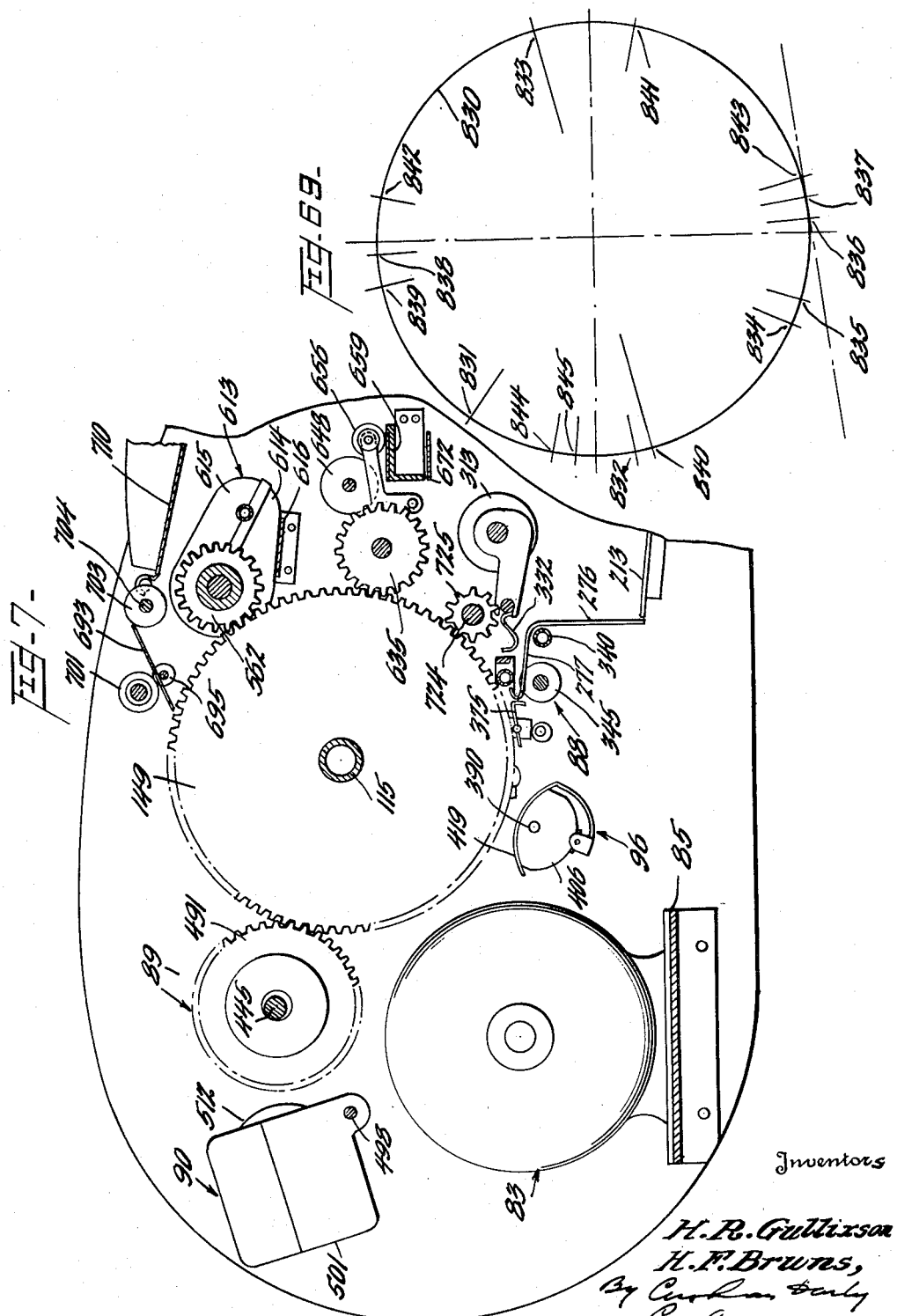

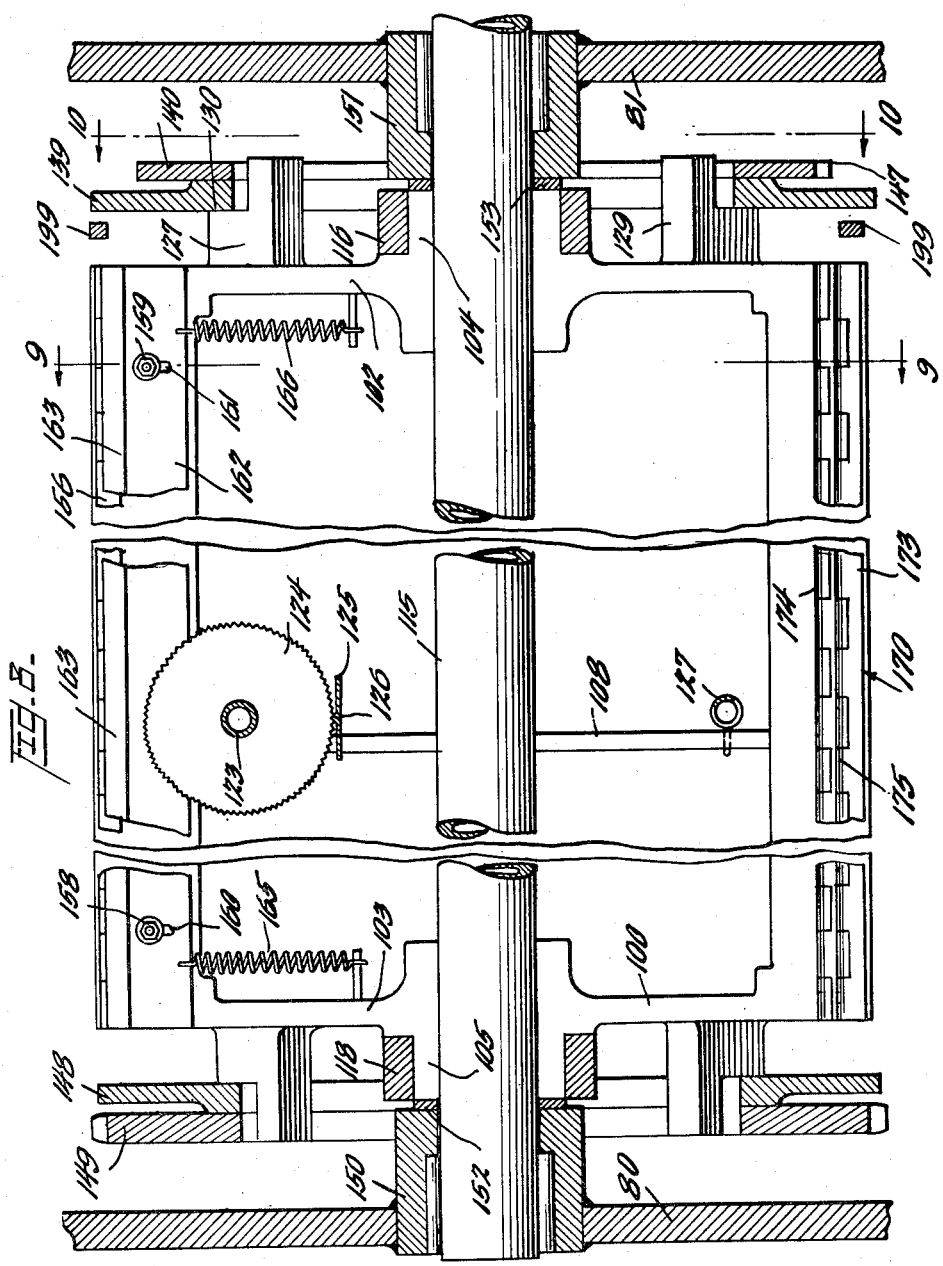

Nov. 24, 1953   H. R. GULLIXSON ET AL   2,660,113
ROTARY OFFSET DUPLICATOR
Filed Nov. 27, 1946   24 Sheets-Sheet 8
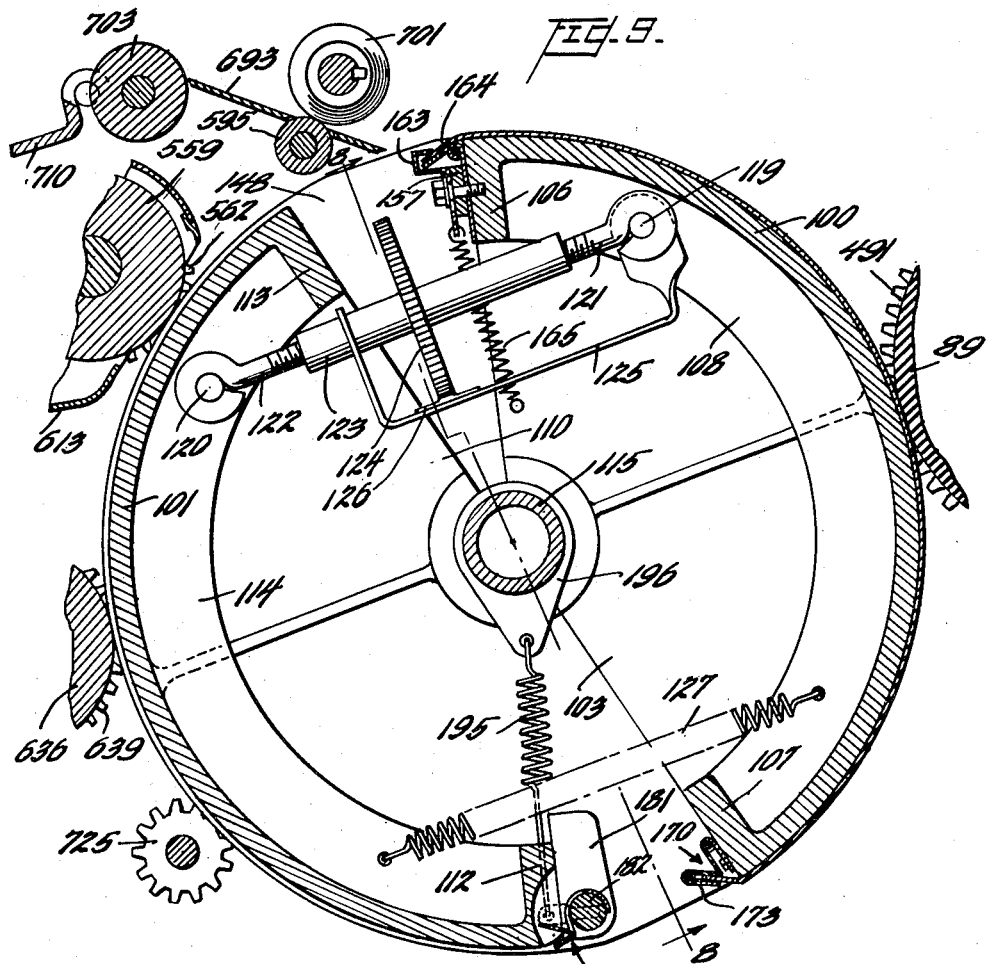
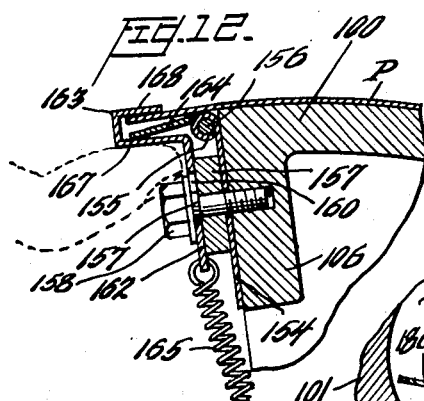
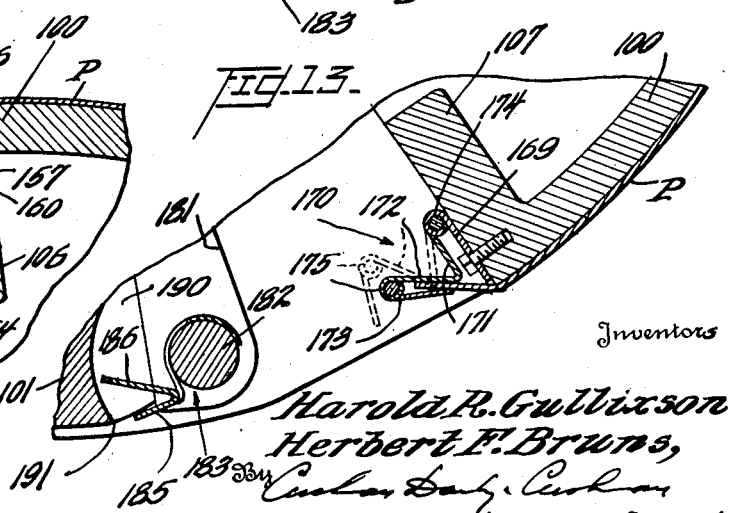

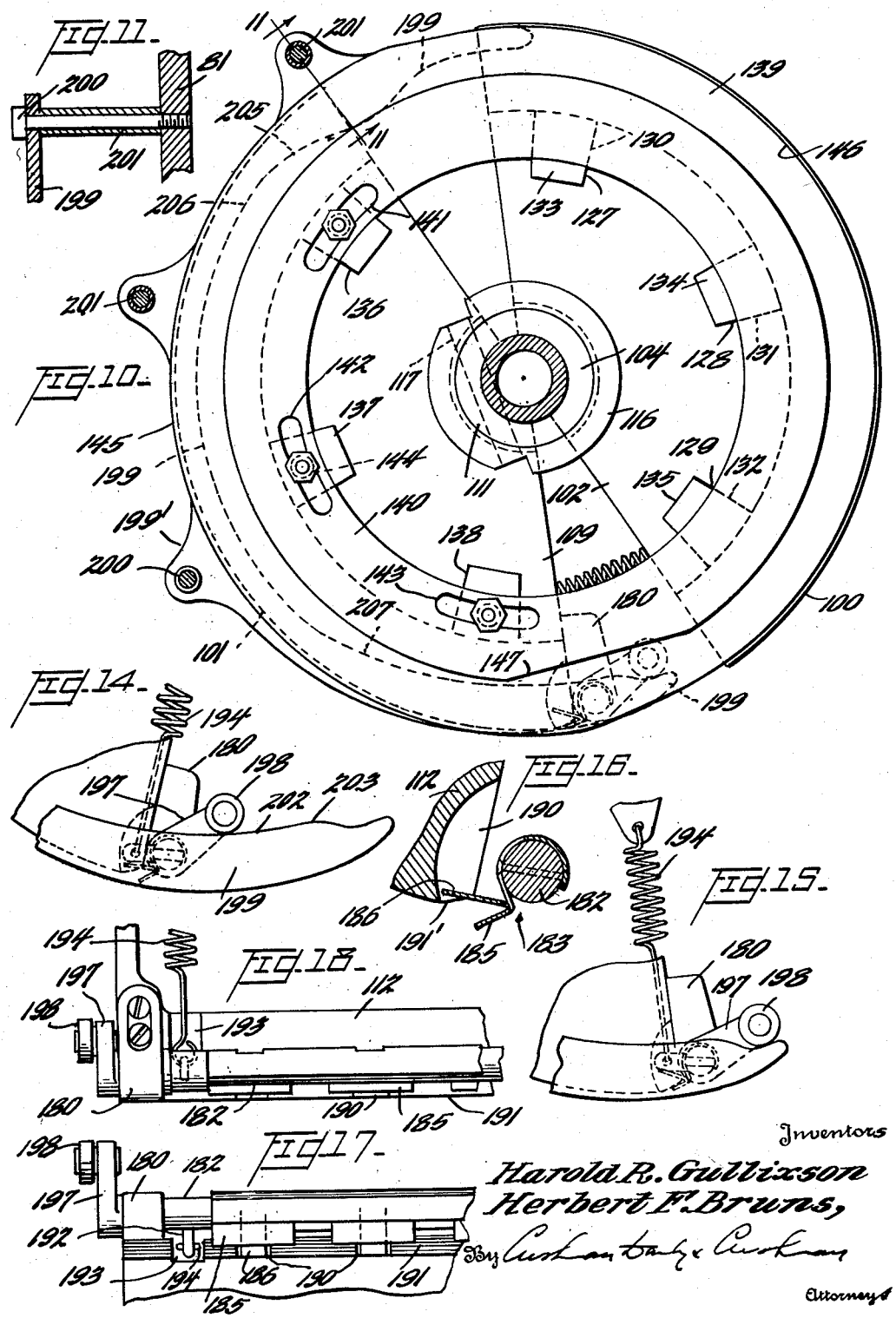

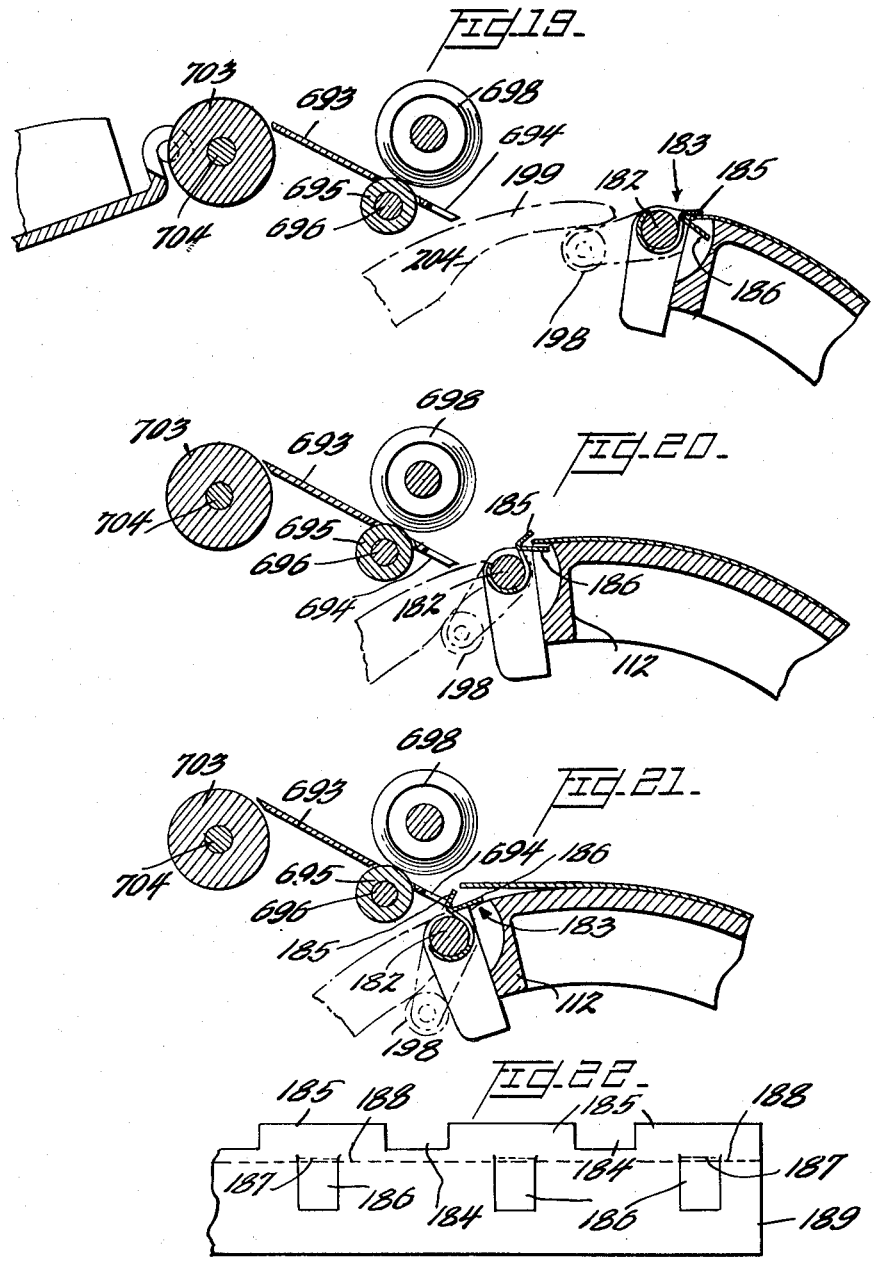

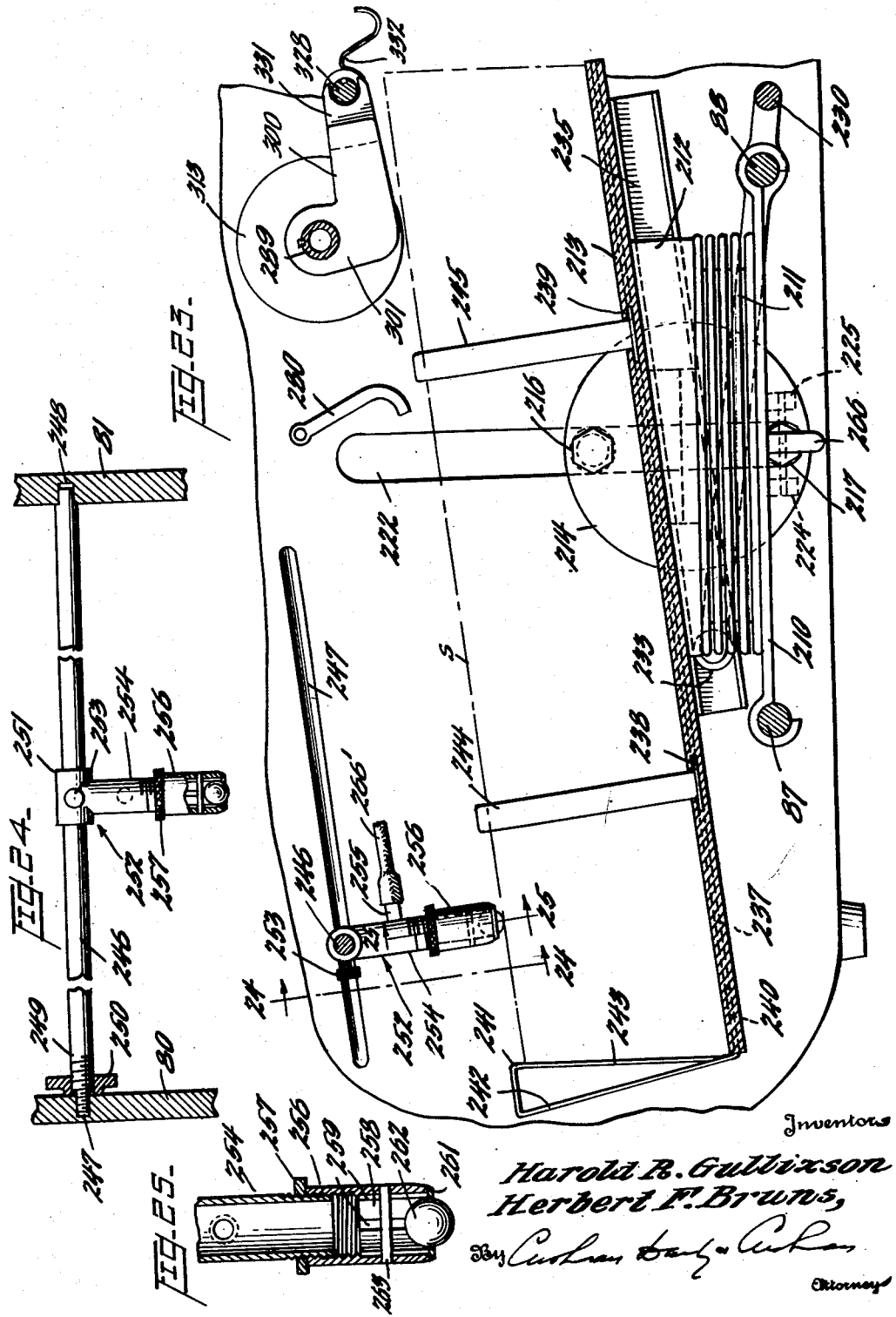

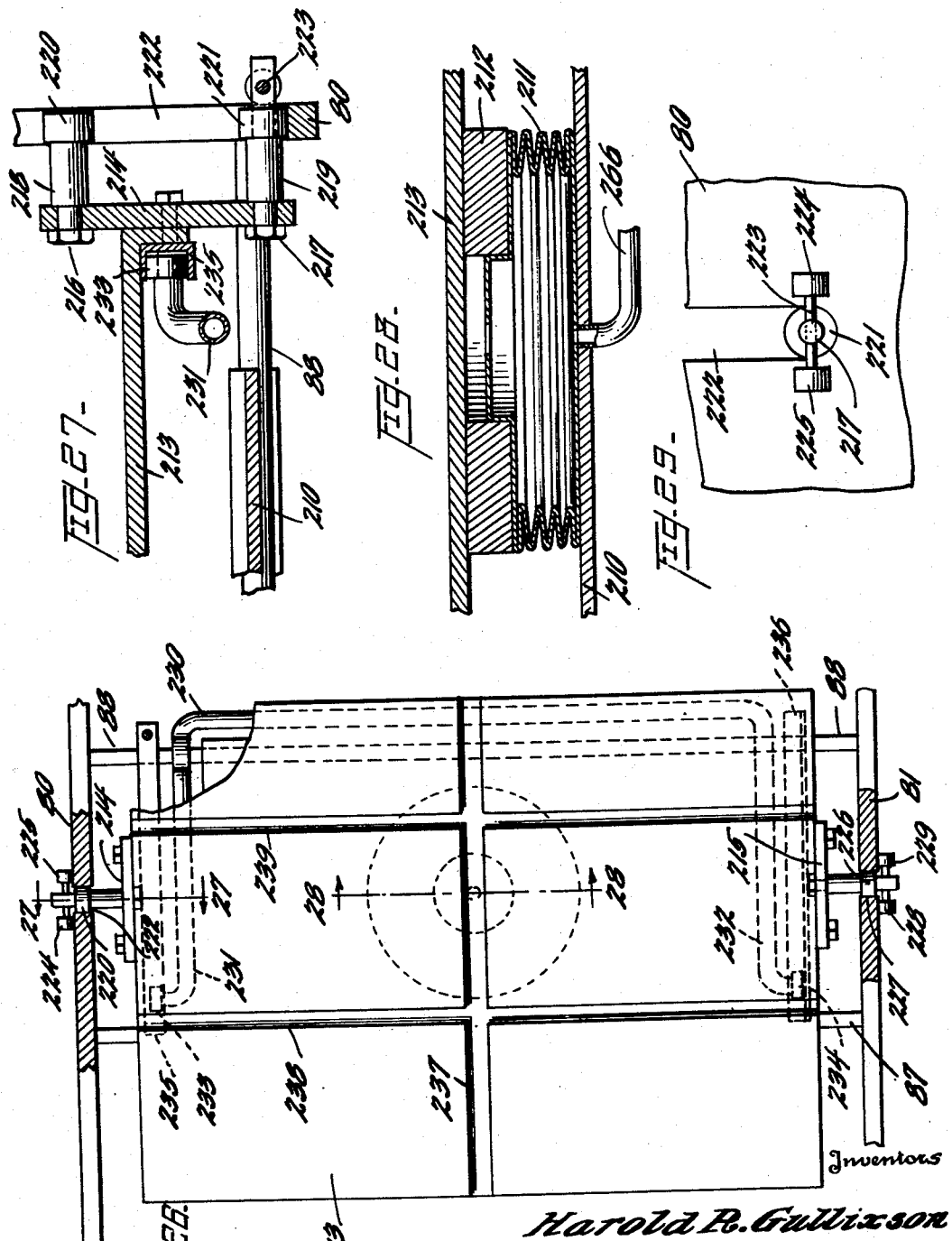

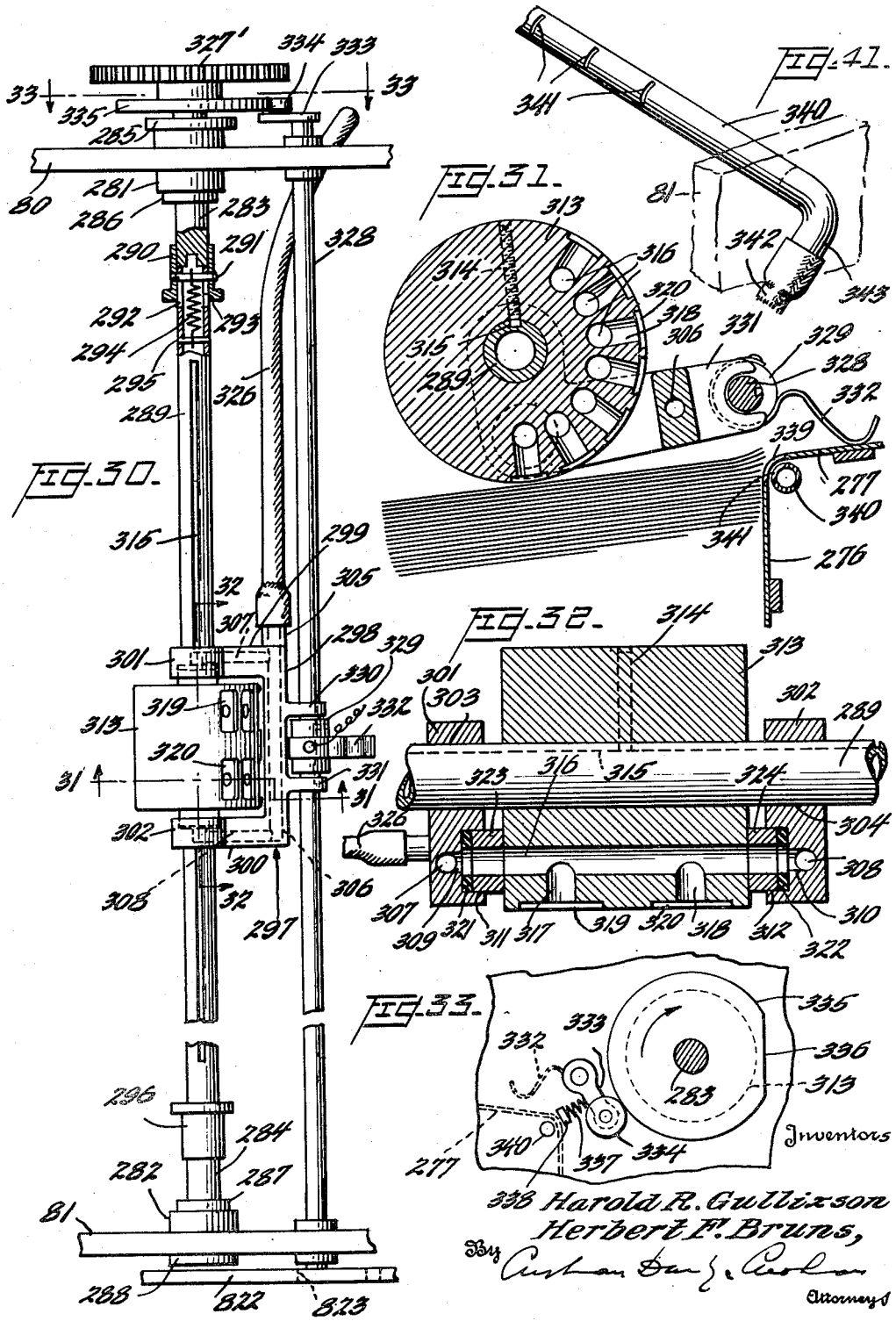

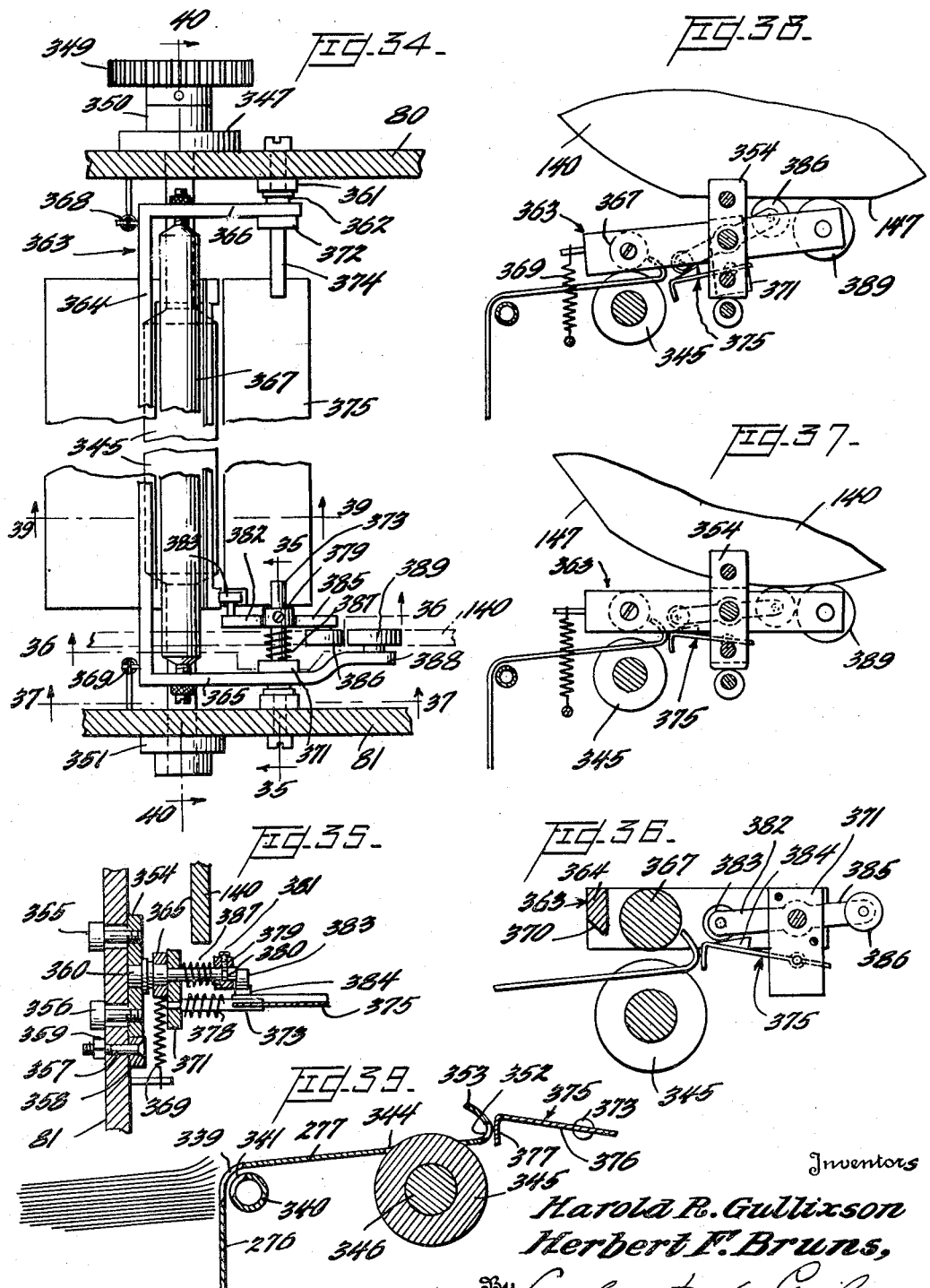

Nov. 24, 1953  H. R. GULLIXSON ET AL  2,660,113
ROTARY OFFSET DUPLICATOR
Filed Nov. 27, 1946  24 Sheets-Sheet 15
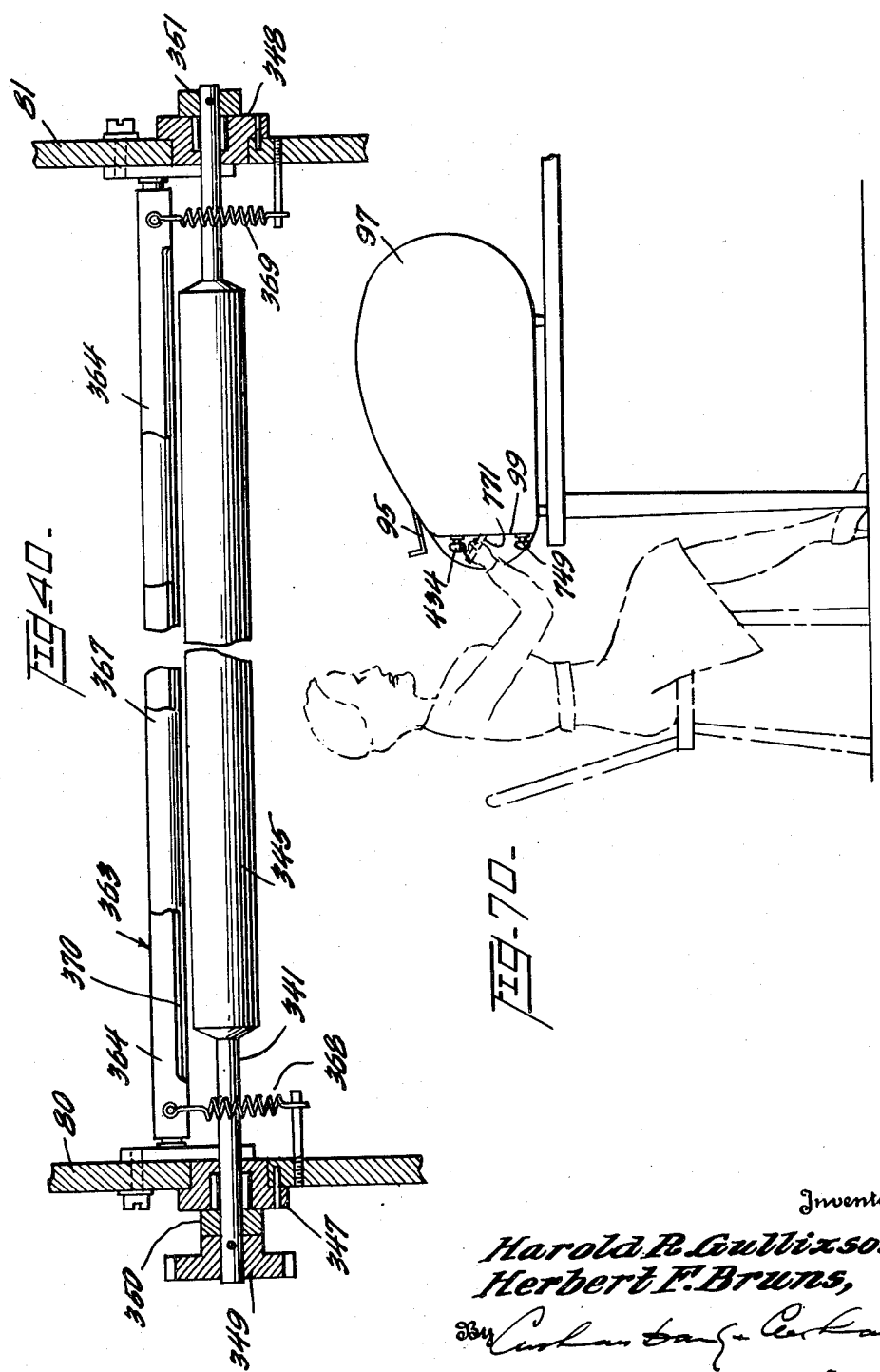

Nov. 24, 1953
H. R. GULLIXSON ET AL
2,660,113
ROTARY OFFSET DUPLICATOR
Filed Nov. 27, 1946
24 Sheets-Sheet 16
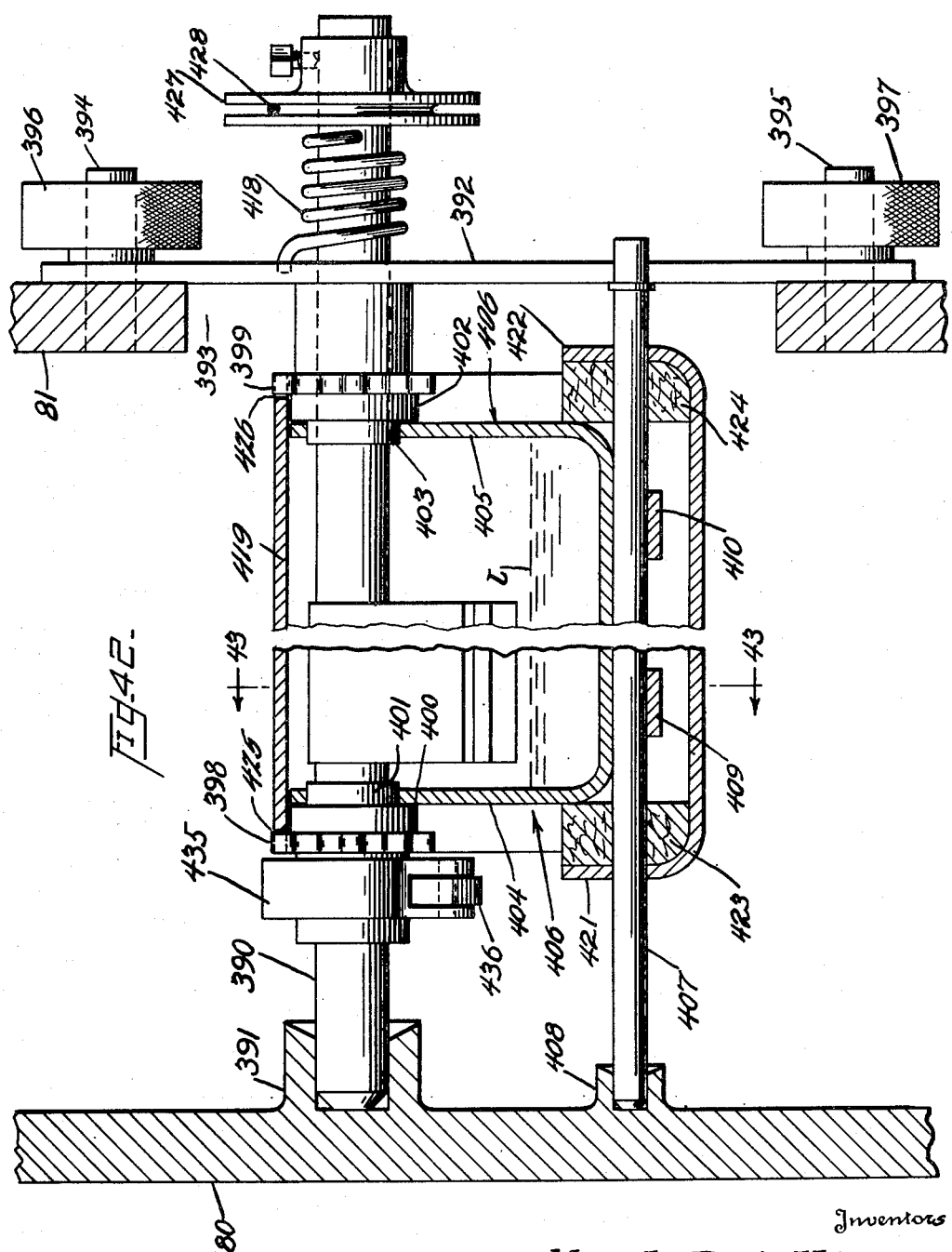
Inventors
Harold R. Gullixson
Herbert F. Bruns
By Cushman Darby Cushman
Attorneys

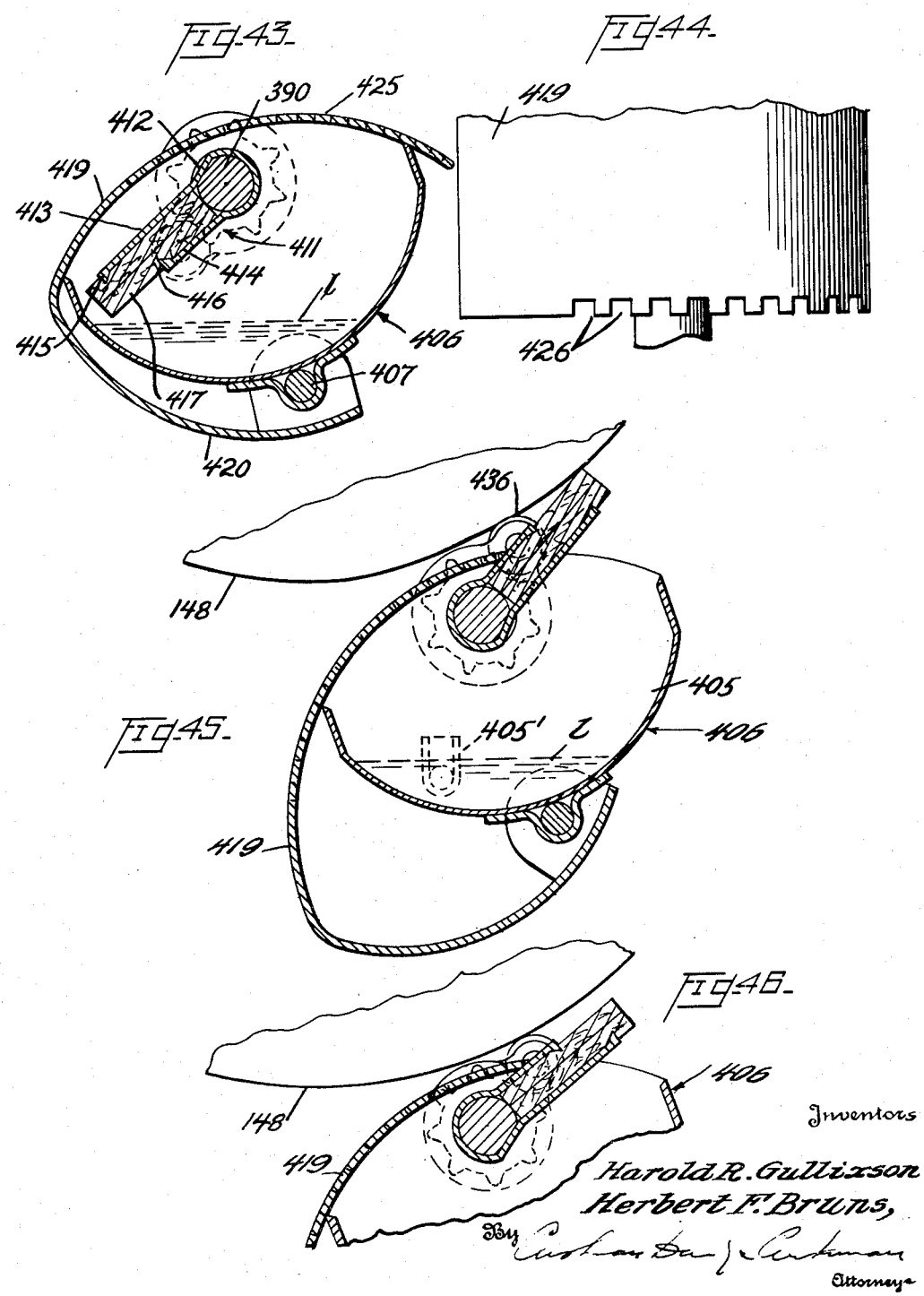

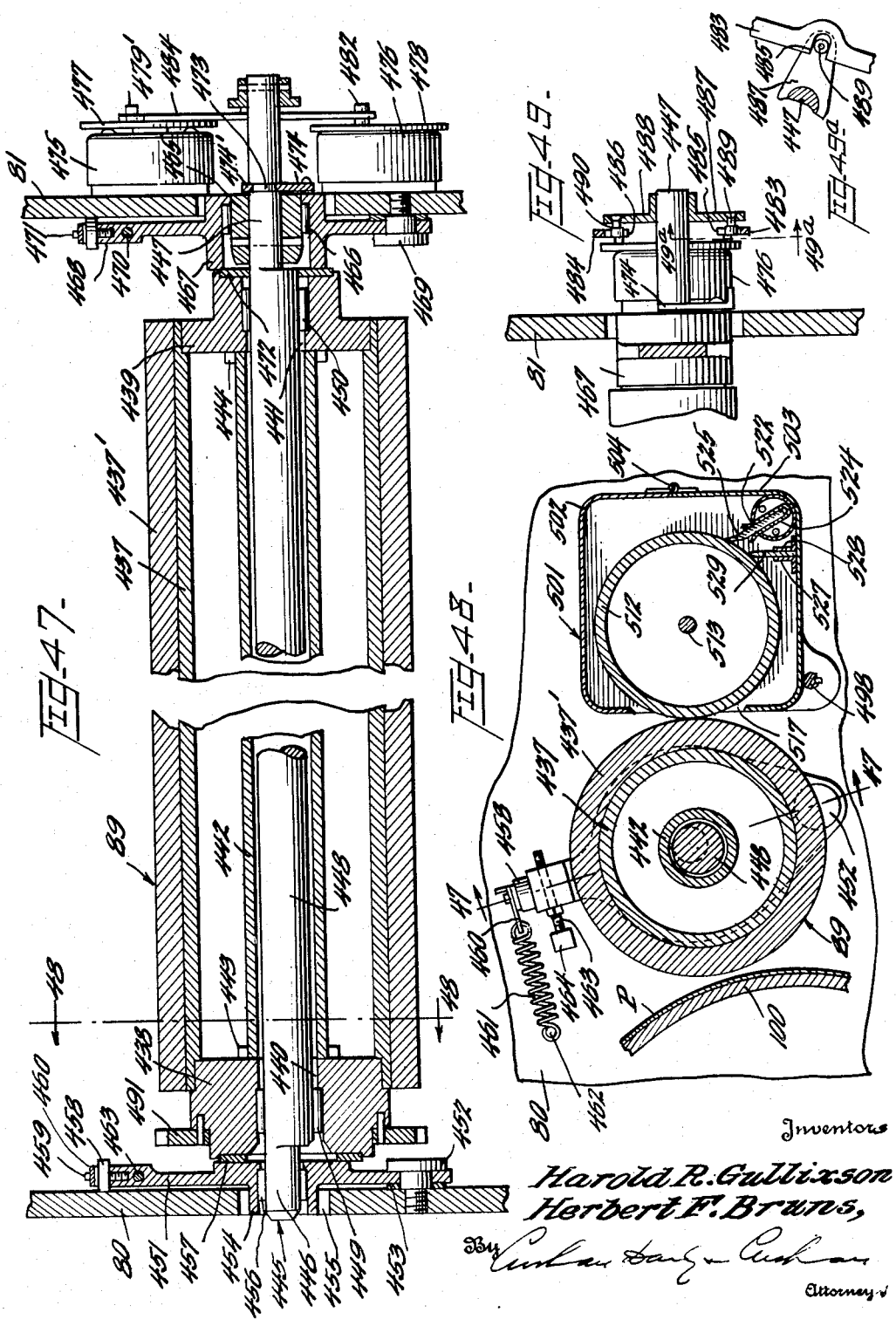

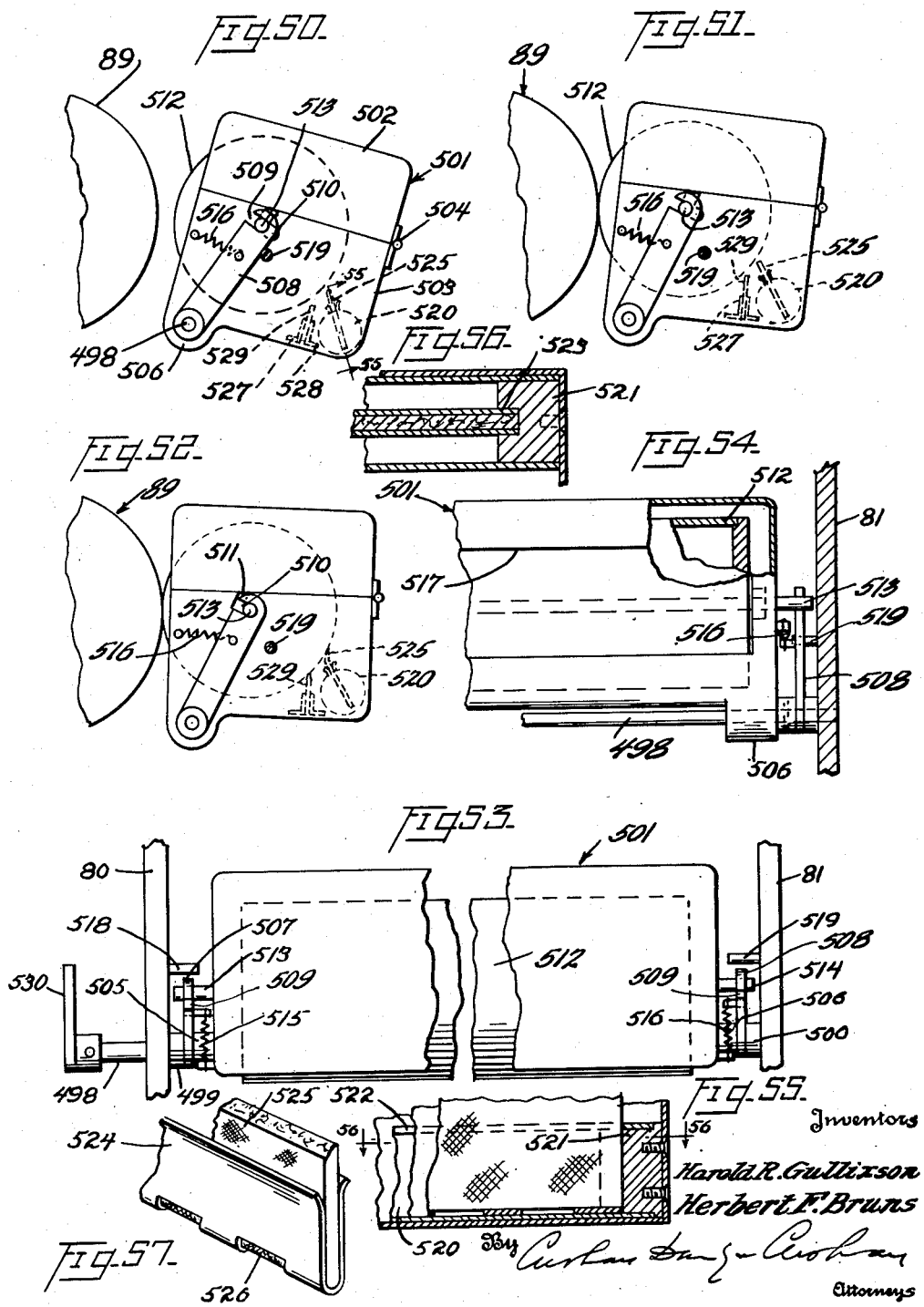

Nov. 24, 1953   H. R. GULLIXSON ET AL   2,660,113
ROTARY OFFSET DUPLICATOR
Filed Nov. 27, 1946   24 Sheets-Sheet 20
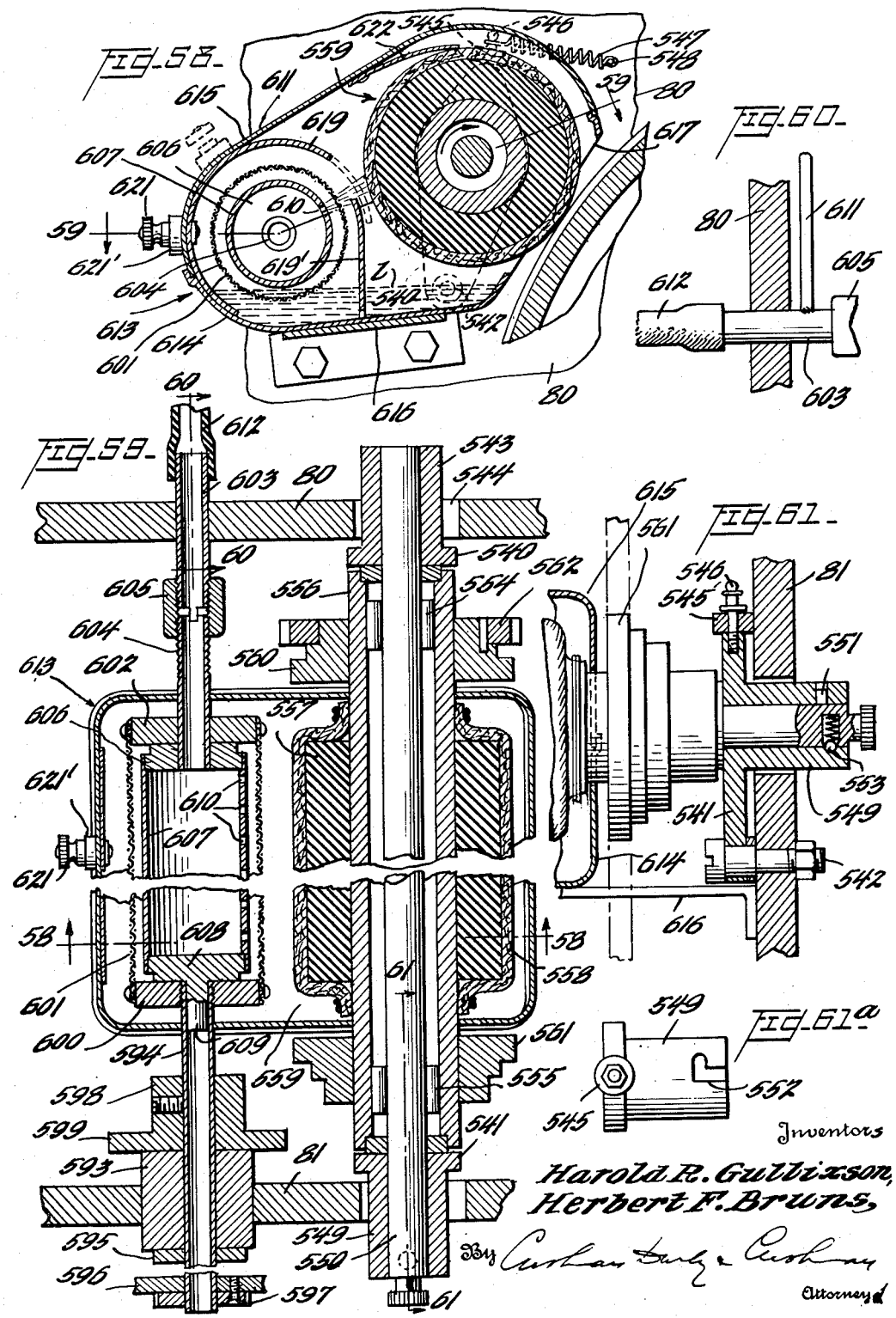
Inventors
Harold R. Gullixson,
Herbert F. Bruns,
By Cushman Darby & Cushman
Attorneys

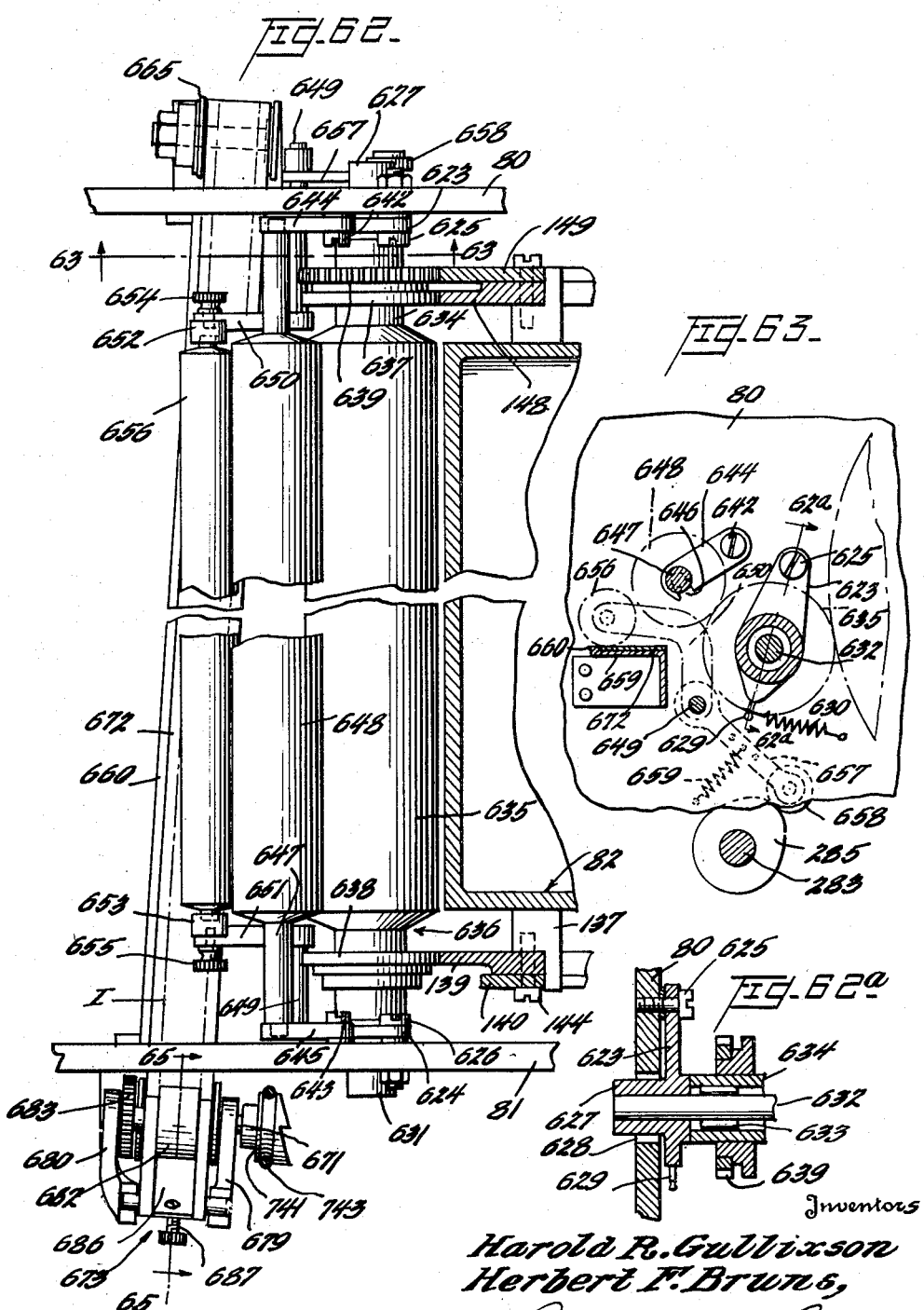

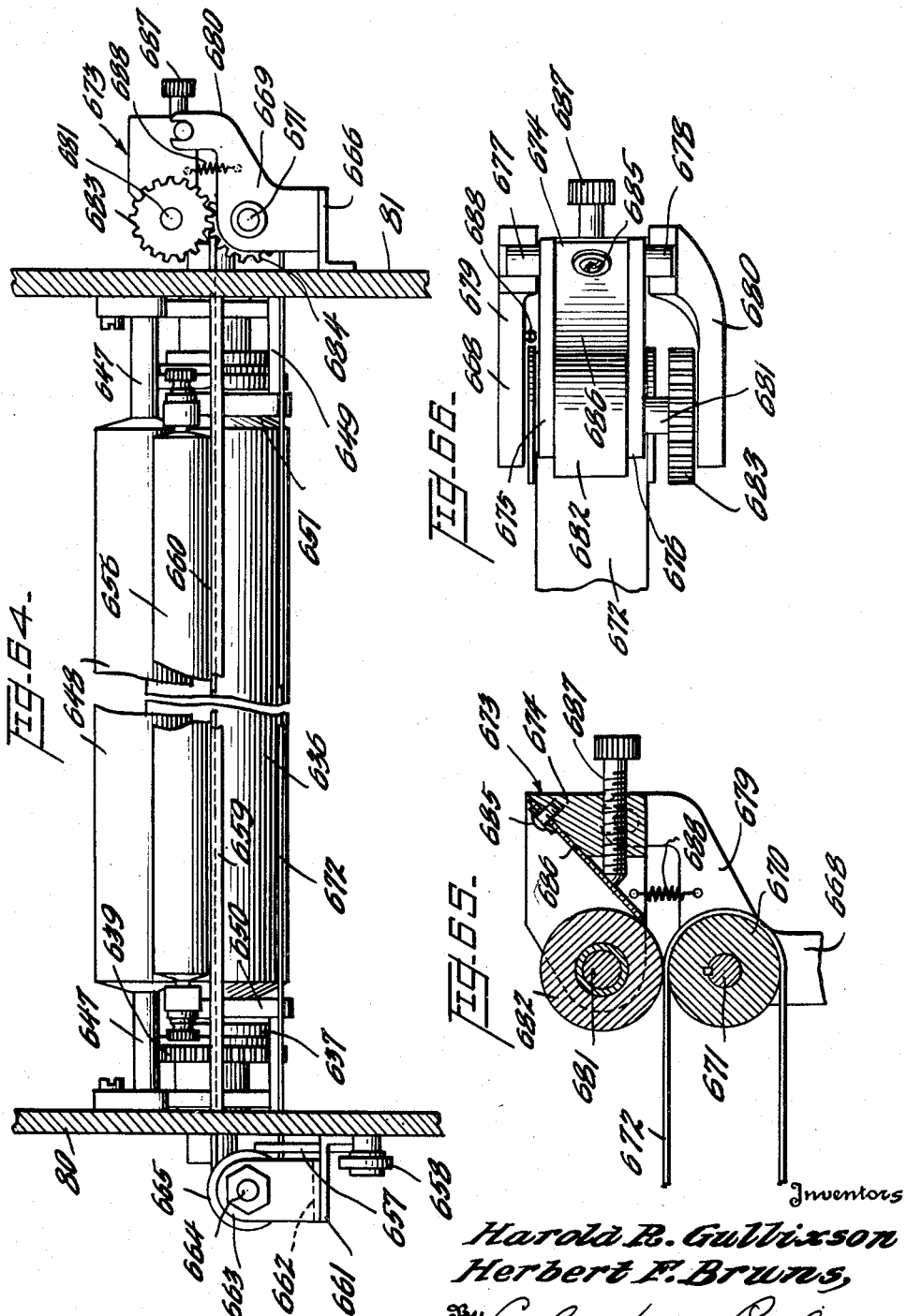

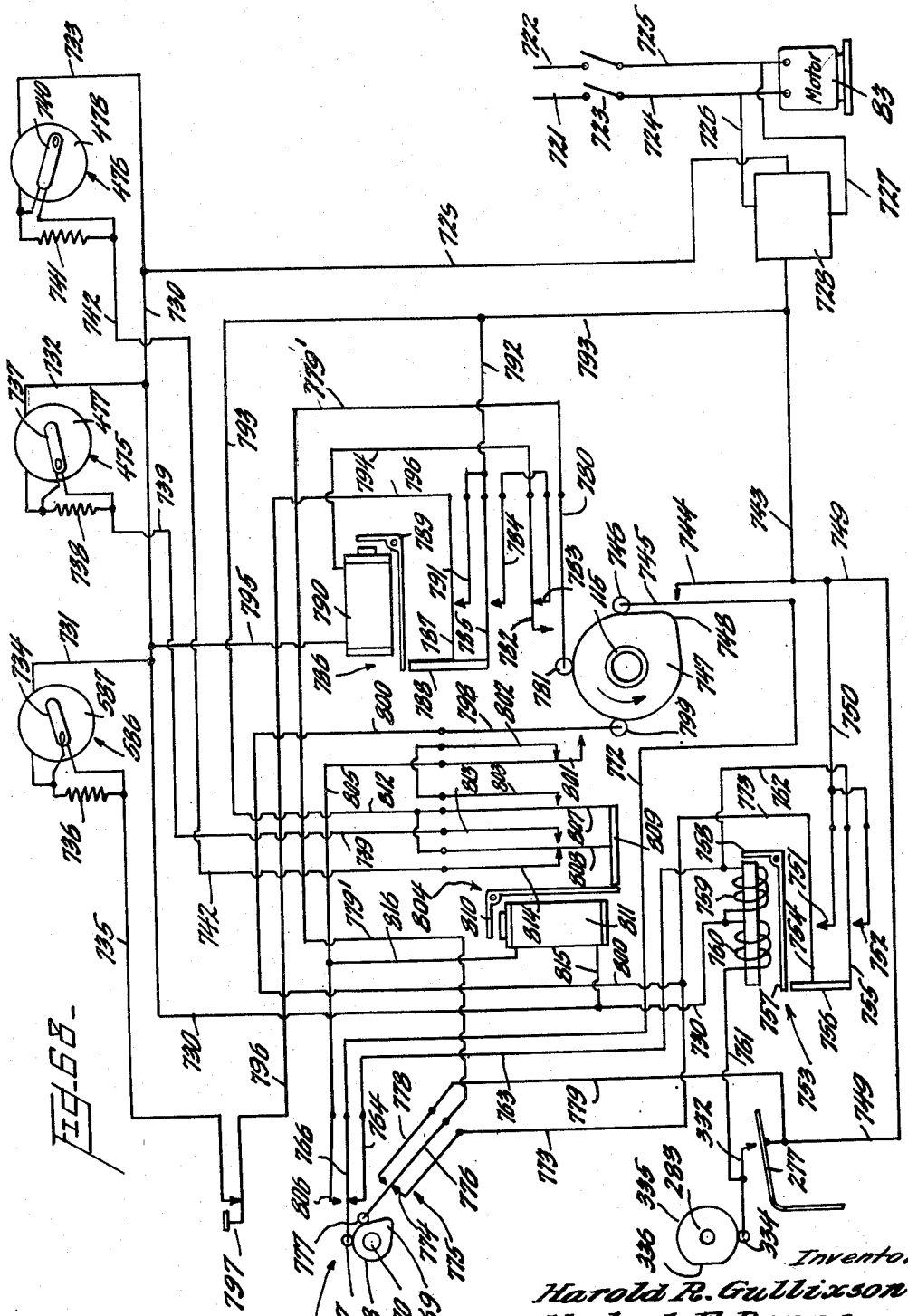

Patented Nov. 24, 1953

2,660,113

UNITED STATES PATENT OFFICE 2,660,113

ROTARY OFFSET DUPLICATOR

Harold R. Gullixson, Arlington, Va., and Herbert F. Bruns, Washington, D. C., assignors, by mesne assignments, to Ditto, Incorporated, Chicago, Ill., a corporation of West Virginia Application November 27, 1946, Serial No. 712,538

12 Claims. (Cl. 101—144)

This invention relates to duplicating machines and in particular to such machines of the offset type.

An object of the invention is to provide a reorganization of the parts of such machines affording a new efficiency in action, completeness of control, and ease of control even by inexperienced operators. Another object is to improve per se various elements or components of the combination and while these improvements unite to provide a machine of the greater efficiency, many of them are of general application.

In the embodiment of the invention to be described herein, there is provided a main cylinder with plate and impression surfaces, together with associated elements or groups of elements which are compactly and accessibly arranged about the cylinder with all controls therefor located so as to be accessible from the front of the machine. The machine is fed from the front either automatically or manually, and in order that an operator at the front of the machine may be constantly advised of the quality of work being produced, the arrangement is such that the printed matter is delivered printed side up at the front of the machine in direct view of the operator. Any adjustments thus observed by the operator to be necessary can readily be made without moving from the front of the machine. Such adjustments include those for image positioning, and for moisture and ink supply.

Notable among the various features of improvement are the following:

The main cylinder is formed of relatively angularly adjustable segments of which one provides the plate or master surface and the other the impression or platen surface, and means are provided whereby any required relative adjustment can be made in a few seconds.

For automatic feed, an extremely accurate and reliable pneumatic stack elevating and height control system is provided, the feeding mechanism including an improved suction wheel which is quickly adjustable crosswise of the machine in proper relation to the blanks being fed. Herein the term "blanks" is used as including any stock to be fed, whether unprinted sheets, sheets requiring only imprinting, envelopes, etc.

An applicator for desensitizing fluid is provided beneath the cylinder and means are provided acting automatically to hold the applicator out while the impression section is passing.

A blanket roll is provided which has a continuous surface of rubber or the like. The roll is disposed behind the main cylinder and at a point disposed at a considerable angle from the point of release of the blank so that danger of the blank following the roll is avoided.

Associated with the blanket roll is a cleaner which can be applied to the roll for the rapid cleaning thereof.

A moistening form roller is provided, disposed at the top front of the main cylinder and novel means are provided for supplying a spray or mist of repellant to the roller, the moisture supply being quickly regulable.

An inking form roller cooperates with the cylinder at the front thereof and the ink supplying means is so designed as to require only a single adjusting screw for the fountain blade.

The control system includes means enabling the form rollers to be brought into contact with the cylinder for initially moistening and inking the plate before paper is fed into the machine and while the blanket roll is out of contact therewith, and enabling the blanket roll to be moved in and out, also before paper is fed, to build up an image thereon. Means are provided for instantaneously throwing out the form rollers and blanket roll when no sheet is fed and for throwing them in either when a sheet is initially fed or is fed after a miss.

Various other features of novelty will be pointed out as the description proceeds with reference to the accompanying drawings in which Figure 1 is a plan view, with parts removed, of one machine made in accordance with this invention, Figure 2 is a section substantially on line 2—2 of Figure 1, Figure 3 is a section substantially on line 3—3 of Figure 2, Figure 4 is a section substantially on line 4—4 of Figure 3, Figure 5 is a right-hand elevation of the machine with parts removed, Figure 6 is a left-hand elevation of the machine with parts removed, Figure 7 is a section substantially on line 7—7 of Figure 3, Figure 8 is an axial section of the main cylinder substantially on line 8—8 of Figure 9, Figure 9 is a section substantially on line 9—9 of Figure 8, Figure 10 is a section substantially on line 10—10 of Figure 8, Figure 11 is a section on line 11—11 of Figure 10, Figure 12 is an enlargement of a top portion of Figure 9 showing in partly open position a head clamp which appears in closed position in Figure 9, Figure 13 is an enlargement of the lower portion of Figure 9 showing in closed position a gripper and tail clamp which appear in Figure 9, Figure 14 is a view of the lower portion of Figure 10, with parts removed, showing the gripper open to receive, Figure 15 is a view like that of Figure 14 showing the gripper closed, Figure 16 shows the lower left-hand portion of Figure 10 with the gripper open, Figure 17 is a bottom plan view of part of the leading end of the impression segment of the main cylinder and gripper, Figure 18 is an elevation of the same parts, Figure 19 is a fragmental section of the upper portion of the cylinder and associated elements with the gripper closed, Figure 20 is a view like that of Figure 19 showing the gripper opening for release, Figure 21 is a view like that of Figure 19 showing the gripper released and the ejector ejecting, Figure 22 is a partial face view of a blank from which the gripper-ejector is formed, Figure 22a is an end elevation of the formed gripper-ejector member with its supporting shaft in transverse section, Figure 23 is an elevation of stack support and height control mechanism, Figure 24 is a section substantially on line 24—24 of Figure 23, Figure 25 is a section substantially on line 25—25 of Figure 23, Figure 26 is a plan view of the apparatus of Figure 23, Figure 27 is a section substantially on line 27—27 of Figure 26, Figure 28 is a section substantially on line 28—28 of Figure 26, Figure 29 is an enlarged elevation of a portion of Figure 26, Figure 30 is a plan view of vacuum feed mechanism with blank detector, Figure 31 is a section substantially on line 31—31 of Figure 30, Figure 32 is a sectional substantially on line 32—32 of Figure 30, Figure 33 is a section substantially on line 33—33 of Figure 30, Figure 34 is a plan view of blank feeding rollers and stop, Figure 35 is a section substantially on line 35—35 of Figure 34, Figure 36 is a section substantially on line 36—36 of Figure 34, Figure 37 is a section substantially on line 37—37 of Figure 34, Figure 38 is a section like that of Figure 37 but showing a different relation of parts, Figures 39 is a section substantially on line 39—39 of Figure 34, Figure 40 is a section substantially on line 40—40 of Figure 34 with parts removed, Figure 41 is an isometric view showing one end of an air separator tube which appears in section in Figure 39, Figure 42 is a section of desensitizer applying means taken substantially on line 42—42 of Figure 2, Figure 43 is a section substantially on line 43—43 of Figure 42, Figure 44 is a plan view of a portion of a cover member which appears in section in Figures 42 and 43, Figure 45 is a view like that of Figure 43 showing the parts in a different position and including in elevation a portion of an actuating cam, Figure 46 is a partial view of the parts of Figure 45 with the parts in another position, Figure 47 is an axial section of a blanket roll and mounting means therefor, the section being taken substantially on line 47—47 of Figure 48, Figure 48 is a section on line 48—48 of Figure 47 and including a portion of the main cylinder and of a blanket cleaner, Figure 49 is a section substantially on line 49—49 of Figure 5, Figure 49a is a partial section on line 49a—49a of Figure 49, Figure 50 is an end elevation of the cleaner of Figure 48 with the cleaner in off position, Figure 51 shows the parts of Figure 50 with the cleaner in an intermediate position, Figure 52 shows the cleaner in a final position, Figure 53 is a plan view of the cleaner, Figure 54 is a partial front elevation of the cleaner with parts broken away, Figure 55 is a partial section substantially on line 55—55 of Figure 50, Figure 56 is a section substantially on line 56—56 of Figure 55, Figure 57 is an isometric view of a cleaner wick and holder, Figure 58 is a transverse section of moistening means, the section being taken substantially on line 58—58 of Figure 59, Figure 59 is a section substantially on line 59—59 of Figure 58, Figure 60 is a section substantially on line 60—60 of Figure 59, Figure 61 is a section substantially on line 61—61 of Figure 59, Figure 61a shows a detail in elevation, Figure 62 is a plan view of inking mechanism with parts in section, Figure 62a is a section substantially on line 62a—62a of Figure 63, Figure 63 is a section substantially on line 63—63 of Figure 62, Figure 64 is a front elevation of the inking mechanism, Figure 65 is a section substantially on line 65—65 of Figure 62, Figure 66 is a plan view of an ink fountain, Figure 67 is an air diagram, Figure 68 is an electrical diagram, Figure 69 is a timing diagram, and Figure 70 is a side elevation of the duplicator in normal operating position.

General organization

As shown in Figure 70, the illustrative machine to be described herein is designed for support on a desk or table. The machine comprises a main frame which includes parallel side plates 80 and 81, Figure 1, between which most of the mechanism is mounted. The side plates may be equipped with supporting feet as indicated in Figures 2, 5 and 6 and, as here shown, the plates have a curvilinear upper edge with the height of the plates diminishing forwardly.

Supported between the plates is a main cylinder 82 which, in the operation of the machine, rotates counterclockwise, Figure 2, and below and rearwardly of the cylinder is a motor 83 which drives all of the driven devices, these including a combined vacuum and pressure pump 84. The motor-pump unit is mounted on a plate 85 whose ends are secured to the side walls, so that the plate also constitutes a cross member of the frame.

Reference numeral 86 designates stack supporting means mounted on a pair of tie rods 77 and 78 which extend between the side walls, the stack supporting means including automatic elevating and height adjusting mechanism. Reference numeral 87 designates automatic sheet feeding and detector means, while reference numeral 88 designates feed rollers and paper stop means located beneath the forward half of the cylinder 82. Reference numeral 96 designates a desensitizing device located beneath the main cylinder somewhat rearwardly of the central vertical plane of the latter. A blanket roll 89 is mounted behind the cylinder and behind the roll is roll cleaning mechanism 90. Moistening mechanism is generally indicated at 91 and inking mechanism at 92, the two being in superposed relation at the front of the cylinder. Reference numeral 93 designates cleaning means for an inking form roller. Paper stripping and delivery mechanism is indicated at 94, reference numeral 95 designating a paper receiving tray. As illustrated in Figure 70, this tray is below the eye level of the operator when the latter is seated in he control position at the front of the machine. The machine may have any desired cover plates and a side cover plate is indicated at 97 in Figure 70. At the sides of its front end, the machine is provided with narrow control panels 98 and 99, Figures 5, 6 and 70.

*Main cylinder—General construction*

Referring in particular to Figures 8, 9 and 10, the main cylinder comprises a pair of cylindrical segments 100 and 101 respectively providing plate and impression surfaces. Segment 100 has at its ends sector shaped spokes 102 and 103 which terminate inwardly in out-turned hub portions 104 and 105. Segment 100 has a circumferential extent of less than 180° and here shown as about 150°. The edges of the spokes 102 and 103 extend radially to the edges of the hub portions 104 and 105 which consequently have a circumferential extent of the same number of degrees as the segment 100. Inwardly projecting radial flanges 106 and 107 extend along the leading and trailing edges respectively of segment 100 and are joined by a central inside reinforcing rib 108 of the segment.

Segment 101 is exactly the same as segment 100, having end spokes 109 and 110, hub portions of which one appears at 111, Figure 10, flanges 112 and 113, and a reinforcing rib 114.

As particularly shown in Figure 10, the hub portions 104 and 111 seat against a shaft 115 and are embraced by a ring 116, a tapered pin 117 securing the ring to hub portion 111 and also to shaft 115. In Figure 8, reference numeral 118 designates a ring which embraces the hub portions at the other end of the cylinder, the ring being secured to shaft 115 through the hub portion of segment 101. The latter segment is thus fixed to the shaft whereas segment 100 is adjustable about the shaft center as guided by rings 116 and 118.

Inwardly of flanges 106 and 113, Figure 9, axially projecting pins 119 and 120 are fixed to ribs 108 and 114 and pivoted on the pins are eye bolts 121 and 122 having oppositely threaded stems engaged in a complementarily threaded sleeve 123. Fixed to the latter midway of its ends is a wheel 124, whose edge is transversely uniformly and rather finely corrugated. A spring strip 125 has one end bent and engaged with pin 119 and the other end bent and provided with an aperture which freely receives the end of sleeve 123 beyond wheel 124. The strip extends substantially tangentially past wheel 124 and is provided with a detent in the form of a sharp rib 126 engageable with the corrugations of wheel 124. Any slackness in the turnbuckle members is taken up by a tension spring 127 which connects the other ends of ribs 108 and 114.

It will be evident that wheel 124 projects outwardly between flanges 106 and 113 so that it is readily accessible to the operator, and by appropriately turning the wheel, segment 100 can be turned in either direction relative to segment 101 for head space adjustment, the wheel always occupying a central position between flanges 106 and 113. The corrugations are so dimensioned that by clicking the wheel a certain number of times past the detent 126, the operator will know that segment 100 will have been adjusted a certain distance relative to segment 101. The fine teeth of the wheel afford substantially micrometric adjustment.

Projecting outwardly from spoke 102 are three bosses 127, 128 and 129, which are symmetrically disposed with respect to the axis of shaft 115, the bosses including outer portions 130, 131 and 132 having faces in a plane normal to the shaft axis. Inwardly the bosses include projecting lug portions 133, 134 and 135 having outer faces in a circle whose center is at the shaft axis. Spoke 109 has three bosses 136, 137 (see also Figure 62, lower right), and 138 exactly like bosses 127 to 129, except that their faces are provided with axially extending threaded bores. Bearing against the face portions of all of the lugs is a ring cam 139 whose inner edge bears against the outer surfaces of the lug portions of the bosses, and the cam is provided with holes registering with the threaded bores of bosses 136, 137 and 138. A second ring cam 140 (Figure 11) lies against the outer face of cam 139 and engages the lug portions in the same manner. Cam 140 is provided with arcuate slots 141, 142 and 143 which receive cap screws 144 passing through the holes in cam 139 and threaded into the bores of bosses 136, 137 and 138, the heads of the screws engaging washers and thereby clamping the cams against the seats of bosses 136, 137 and 138. Bosses 127 to 129 are freely movable with respect to the cams and so do not interfere with the relative adjustment of the segments.

Cam 139 has a dwell 145 on a curve whose radius is somewhat greater than the cylinder radius, this dwell extending throughout the impression segment. Another dwell 146 is curved on a radius somewhat less than that of the cylinder and extends throughout the plate segment. The trailing end of dwell 145 merges with the leading end of dwell 146 through a 15° drop, as here shown, which is symmetrically disposed to the gap between the adjacent cylinder sections when the latter are symmetrically disposed about shaft 115, as in Figure 10, and a similarly disposed rise connects the trailing end of dwell 146 with the leading end of dwell 145. As shown in Figure 8, the outer margin of cam 139 is relieved to provide clearance between it and cam 140. The latter has a radius less than that of the cylinder and includes a flat 147 opposite the leading end of dwell 145. Cam 139 is maintained in fixed relation to the impression segment by screws 144, but by loosening the latter, cam 140 can be angularly adjusted throughout the range of the the slots 141 to 143.

Spoke 110 is provided on its outer face with bosses exactly like bosses 136 to 138, and spoke 103 has bosses exactly like bosses 127 to 129. These bosses support in fixed relation to the impression segment a cam 148, Figure 8, which is a duplicate of cam 139 and in register therewith, and clamped against the outer face of cam 148 is a gear 149 whose pitch radius is substantially the same as the cylinder radius. It will be understood that cam 148 and gear 149 are fixed only to the impression segment, just as in the case of cams 139 and 140, so as to permit free relative adjustment of the segments. The ends of shaft 115 are supported in roller bearings in housings 150 and 151 set in side walls 80 and 81, Figure 8, with spacers 152 and 153 between the housings and the hubs.

Plate clamps

Seated against the outer face of flange 106 is a leaf 154 of a piano type hinge 155 whose joint 156 extends along the leading edge of segment 100 slightly inwardly of the latter. A spacer bar 157 is borne against leaf 154, Figure 12, by the shoulders of cap screws 158 and 159, see also Figure 8, the stems of the screws passing through holes in the bar and being threaded into openings in flange 106. The enlargements of the screws are reecived in radial slots 160 and 161 of a plate or slide 162 for the purpose of guiding the latter. The outer edge of plate 162 is bent to provide a channel 163 which is faced toward segment 100 and freely receives the other leaf 164 of hinge 155, the inner and outer walls 167 and 168 of the channel being spaced apart a distance greater than the thickness of the leaf. Springs 165 and 166 are connected at one end to plate 162 and at the other to pins projecting inwardly from the spokes of segment 100. In Figure 12, the operator is pulling plate 162 outwardly against the action of the springs, and leaf 164 lies against the inner wall 167 of channel 163 with a space between the leaf and the outer wall 168 of the channel into which the head end of a plate P can be introduced. When the operator releases plate 162, the latter is pulled inwardly by the springs so that the head end of the plate P is clamped between the outer edge of wall 168 and leaf 164 as clearly shown in Figure 9.

Secured along the outer face of flange 107 is one leaf 169 of a double leaf spring hinge 170 which includes an intermediate leaf troughed to provide angularly related portions 171 and 172 to the latter of which is hinged a leaf 173. The joints are of piano type, and spiral springs associated with the joint 174 and wound around the pintle act to swing the intermediate leaf away from leaf 169. Springs similarly associated with joint 175 act to swing leaf 173 against leaf portion 172. With the hinge held against the action of the two sets of springs, as in Figure 13, the tail end of the plate P can be inserted between leaves 172 and 173, and the latter released so as to clamp the plate between the two. The spreading action of the springs associated with joint 174 is then effective to tension the plate P as indicated in Figure 9.

Sheet gripper and ejector

Bearing blocks 180 and 181, Figures 9, 10 and 13 to 18, are radially adjustably secured against the outer face of flange 112 at the ends of the latter and support a rock shaft 182 which carries a gripper-ejector member 183. This member is conveniently made from a strip of light sheet metal of suitable length. Referring to Figure 22, the blank is notched at 184 at equally spaced intervals along one edge to provide tongues 185 of rectangular form. Inwardly of the tongues, smaller tongues 186, which extend oppositely with respect to tongues 185, are stuck out of the plane of the strip along bending lines 187 and are bent on a sharp radius into about a 35° relationship to the plane of tongues 185. The strip is then bent on an easy radius along line 188 into substantially rectangular relation to the plane of tongues 185 and then is oppositely bent around shaft 182 and secured thereto. The bottom of the angle between the two sets of tongues or fingers is thus disposed away from shaft 182 at the end of a tangential strip portion 189 with the outer plane of fingers 185 substantially tangential to the shaft about 90° away from the point of tangency of portion 189, as most clearly shown in Figure 22a. Flange 112 is provided with generally radially extending grooves 190 for the free reception of the tongues or fingers 186 which are disposed inwardly of the tongues or fingers 185. In the closed position of the parts, Figure 13, the outer ends of fingers 185 bear against the arcuately relieved segment margin, engaging the arcuate lands 191 between the grooves 190 with the fingers somewhat inwardly of the circle of the cylinder. Adjacent its ends shaft 182 is provided with radially projecting pins as at 192 which project into grooves as at 193 of flange 112 and are engaged by tension springs 194 and 195. As shown in Figure 9, the other end of spring 195 is engaged with an anchor member 196 which is hung on shaft 115, and the other end of spring 194 is engaged with a similar anchor member. The springs normally yieldingly hold fingers 185 against the lands. These fingers constitute gripper fingers, and fingers 186 eject fingers, the latter being longer than the former and the angle between the two, as here shown, being about 35°. The bottom of the angle between the two sets of fingers, against which the paper is fed in the operation of the machine, is eccentric to the swinging axis of the fingers and moves toward the sheet edge in gripping and away therefrom in ejecting.

Fixed to the right hand end of shaft 182 (Figures 14, 17, 18) is an arm 197 carrying a roller 198 for cooperation with a cam 199 supported from side wall 81 through outwardly projecting ears 199', Figure 10, by means of bolts and spacers as at 200, 201, Figure 11. Cam 199, Figure 10, starts just beyond the vertical plane of the cylinder at the top of the latter and extends counterclockwise around the cylinder to a point past the said vertical plane. In Figure 14, roller 198 is on a gradual rise 202 of the cam so that the gripper is in open position to receive a blank, this position being shown also in Figure 16, the ejector fingers 186 being below the outer surface of the lands. When the leading edge of the sheet in the gripper comes to a position about 4° past the vertical axial plane of the cylinder, roller 198 reaches a fall 203 of the cam, and springs 194 and 195 act to quickly close the gripper, say, 10° past bottom center. The closed position is illustrated in Figures 13, 15, 17 and 18.

When the leading end of the blank is somewhat past the vertical axial plane of the cylinder at the top thereof, roller 198 engages a rise 204 of cam 199, and the gripper starts to open, although the gripper fingers still overlie the leading margin of the blank to prevent its premature escape, Figure 20. As the top of the rise is approached, the ejector fingers strike and throw up the end of the blank, as shown in Figure 21, and roller 198 travels through a fall 205 which terminates in a dwell 206, Figure 10, so that the gripper fingers resume their closed position. When roller 198 reaches a gradual rise 207 at the bottom of the cam, the gripper starts to open. The gripper must be closed during its downward travel in order to clear the moistening and inking devices.

The described gripping means requires minimum paper area for gripping. The numerous alternating gripper and ejecting fingers and the reverse movement of the gripper when closing assure accurate registration and positive gripping for any size sheet. The forward movement of the gripper when opening releases and clears the leading edge of the sheet and permits the ejector to function positively. The unit construction of the gripper and ejector positively relates the action of the two. Obviously, the common actuating means for the gripper ejector unit is an improved feature of simplification. This unit may be swung, for example, about 25° for receiving and about 15° more for ejecting.

*Stack support and height control mechanism*

Referring to Figures 1, 2, 3 and 24 to 29, a plate 210 has its ends hooked over tie rods 77 and 78 so that the plate is supported horizontally. Fixed on top of the plate is a bellows 211 whose upper end is secured to a wedge-shaped block 212 which supports a table 213, at, as here shown, an upward and rearward inclination of seven degrees. Fixed to down-turned side flanges of the table 213 directly opposite each other are vertical plates 214 and 215. Through vertically spaced apart bolts 216 and 217 and spacers 218 and 219, plate 214 supports rollers 220 and 221 in a vertical slot 222 formed in the side plate 80, and, as shown in Figure 27, the stem of bolt 217 is continued beyond the side plate and supports a horizontal axle 223 upon which are mounted rollers 224 and 225 adapted to roll on the outer margins of slot 222. Plate 215 similarly supports a pair of vertically spaced rollers, of which the top one appears at 226, Figure 26, working in a vertical slot 227 directly opposite slot 222, the lower bolt being extended past side wall 81 and supporting rollers 228 and 229 which roll on the outer margins of slot 227. The vertically spaced rollers working in slots 222 and 227 guide the table 213 for strictly vertical movement, the closed top and bottom ends of the slots serving as stops for the rollers whereby to positively limit the up and down travel of the table. Rollers 224, 225, and 228, 229, prevent lateral displacement of the table.

Pivoted on rod 88 is a U-shaped bar 230 including arms 231 and 232 which project beneath the table and have out-turned ends mounting coaxial rollers 233 and 234 which are guided in opposed channels 235 and 236 fixed in parallel relation beneath the table. The table is thus stabilized against any lateral wobble.

The top of the table is provided with a central fore and aft T slot 237 and with intersecting transverse T slots 238 and 239. Slidable in slot 237 is the tongue 240 of a back stop 241 in the form of a triangle which extends the width of the table and whose sides 242 and 243 are each inclined seven degrees from the altitude of the triangle, the altitude being perpendicular to tongue 240. Thus, while the stack S, Figure 23, is supported on the table at a seven degree inclination to the horizontal, the rear end of the stack is in a vertical plane against the back stop. Should the required adjustment of the back stop be such that the tongue 240 might interfere with similar tongues of side supports as at 244 and 245, the stop 241 can be reversed so that side 242 becomes the effective side and just as the side 243, will establish the verticality of the forward edge of the stack.

A round bar 246 has flattened ends received in parallel grooves 247 and 248 formed in the side plates above the level of the stack top and parallel to table 213. One end 249 has threaded thereon a thumb nut 250 which can be threaded against the side plate 80 to lock the rod 246 in the required position, or can be loosened to permit adjustment of the rod along the top of the stack fore and aft. Slidable upon the rod 246 is the head 251 of a T fitting 252, the fitting being lockable in any required position on the rod by means of a thumb screw 253. The fitting includes a depending hollow shank portion 254 which is closed at its upper end and thereebeneath is provided with a communicating nipple 255. Threaded on the lower end of the shank 254 is a tubular member 256 adapted to be locked in adjusted position by means of a knurled nut 257. The lower portion of member 256 is inwardly thickened to provide a cylindrical passage 258 which is vertically grooved to provide open-ended channels 259. Fixed to the outer extremity of member 256 is a disc 261 having a tapered opening providing a seat for a ball 262 whose diameter is very slightly less than that of the cylinder 258. The ball is normally supported on the seat slightly below its maximum diameter. Its movement away from the seat is limited by a pin 263 which extends across the cylinder 258 and is so disposed that when abutted by the ball, the ball will still project substantially outwardly of the seat, as shown in Figure 24.

Referring to Figures 6 and 67, a pipe or tube 264 is connected to the pressure side of pump 84 through a control and relief valve 265. Branched from pipe 264 is a pipe 266 which extends forwardly outside of wall 80 and upwardly to have its upper end connected through a flexible hose 266' with nipple 255 of the height control valve 252. Interposed in pipe 266 are a control and shut off valve 267, a check valve 268, and an orifice plate or choke 269, in that order. Beyond the choke, a pipe 270 connects pipe 266 with bellows 211. A by-pass 271 is arranged around valve 268 and choke 269 and includes a normally closed control valve 272 and a normally closed relief valve 273. Hose 266' is led through an opening 274 in side wall 80 and is long enough to permit fitting 252 to be mounted at the extreme right of bar 246. When the fitting is otherwise positioned, the slack can be pushed or pulled back through the side wall opening.

Assuming the table 213 to be in a lowered position with the stack out of contact with ball 262, the latter will be seated so as to prevent air escape past it. The entire pressure is, therefore, delivered through the check valve and choke to the bellows and the latter expands, lifting the stack into engagement with the ball. The unseating of the ball, whose escape area is greater than that of the choke, permits escape of pressure past it through channels 259 with the result that the stack is sustained in a definite balanced position. That is to say, the pressure which would seek to expand the bellows further is exhausted past the ball and a definite balance is maintained. As a sheet is removed from the top of the stack the stack is immediately lifted by that much and the balance again established.

Should the pump be stopped, the check valve will prevent the stack from dropping beyond the point at which the ball again seats. Should it be desired to elevate the stack rapidly, valve 272 can be opened, thus by-passing the choke 269, and if it should be desired to lower the stack rapidly the relief valve 273 can be opened.

Due to the provision of the adjustable stack-confining means, such as 241, 244 and 245, stacks of variously sized blanks can be positioned variedly on the table 213. Due to the fore and aft adjustability of the bar 246 and the lateral adjustability of the fitting 252, the latter can be readily positioned in the necessary relation to the stack as permitted by the flexible hose. In Figures 23 and 67 the fitting 252 is adjacent the rear end of the stack and this is an ordinarily desirable relationship since the pressure escaping past the ball helps to hold down the rear end of the top blank. Since the ball is prevented by pin 263 from being pushed completely within member 254, the stack can never be jammed against the seat washer 261 so as to block escape through the latter.

A sheet of plate metal, Figure 2, is bent on a radius to provide angularly related portions 276 and 277 which are supported by bars 278 and 279 whose ends are fixed to the side walls. Portion 276 is vertically disposed and extends along the inner end of table 213 and downwardly through the range of travel of the table with its front surface just clear of the table edge. Portion 277 projects rearwardly of the machine in parallel relation to table 213 and has a flat top surface substantially in continuation of the top sheet of the stack on the table for the reception and support of the fed sheets. Should it be desired to feed by hand, the valve 267 is closed so that pressure is cut off from the stack lifting and control devices. Hose 266' may be disconnected from fitting 252, and the latter together with bar 246 may be removed by suitably threading nut 250 away from wall 80. For hand feeding, the top of the table should be substantially flush with the top of guide plate 277. Upon manually lifting the table, it can be locked in this position by hooks as at 280, Figure 23, pivoted to the side walls above slots 222 and 227 and engageable under the spacers for rollers 220 and 226. The latches as at 280 are normally retained in the position shown in Figure 23, clear of the slots, by any suitable friction or detent means.

*Sheet feeding and detector means*

Journaled in the side walls 80 and 81, Figure 30, in bearings 281 and 282 are coaxial stub shafts 283 and 284, the position of shaft 283 being maintained by a cam 285 and a collar 286 fixed to the shaft at the opposite ends of bearing 281 and the position of shaft 284 being similarly maintained by stop collars 287 and 288. An intermediate hollow shaft portion 289 extends between the stub shafts and is releasably coupled thereto. As here shown, the adjacent ends of shaft 283 and 289 are complementarily tongued and grooved and are held in alignment by a sleeve 290, a diametrically extending pin 291 being fixed to the sleeve and slidable in slots 292 and 293 in shaft 289, the pin being normally forced against the outer ends of the slots by a compression spring 294 disposed between pin 291 and a pin 295 extending through shaft 289. Shaft portions 284 and 289 are similarly releasably coupled, the coupling sleeve being indicated at 296. The adjacent ends of shaft portions 284 and 289 are tongued and grooved in the same planes as the ends of shaft portions 283 and 289 and consequently by moving the coupling sleeves toward each other so as to clear the ends of shafts 283 and 284, shaft 289 is readily released therefrom.

A yoke 297 includes a cross portion 298 and arms 299 and 300 which have upturned ends 301 and 302 provided with coaxial openings 303 and 304 which slidingly receive shaft 289. A nipple 305 projects from cross portion 298 toward the left side wall and is in communication with a duct 306 in the cross portion, branches 307 and 308 leading from duct 306 through the arms to inwardly faced ports 309 and 310 in the outer ends of the arms, the ports being aligned on a line parallel to shaft 289. The ports terminate in coaxial bores 311 and 312. Reference numeral 313 designates a suction feed wheel which is slidable on shaft 289 between and with arms 299 and 300. The wheel has a threaded radial bore in which is engaged a headless screw 314 having a reduced inner end engaged in a groove 315 which extends substantially throughout the length of shaft 289. The screw serves as a spline to enforce rotation of wheel 313 with shaft 289 and when the screw is tightened, it serves to lock the wheel against axial displacement relative to the shaft. The outer end of the screw is beneath the surface of the wheel.

Adjacent its periphery, wheel 313 is provided with a series of equally spaced apart parallel bores 316 which are of equal size with their centers disposed on a common circle. Each of the bores is intersected by radial bores 317 and 318 which terminate outwardly in axially elongated depressions 319 and 320. Received in bores 311 and 312 are resilient washers 321 and 322 and washers 323 and 324 of fiber or the like which are yieldingly urged against the sides of wheel 313 by the resilient washers, and the arrangement is such that when the wheel is turned, the bores 316 successively come into register with the washer openings, the latter being otherwise closed by the solid sides of the wheel.

Connected into the suction side of pump 84, Figure 67, through a control and relief valve 325 is a pipe 326 whose terminal portion, at least, is a flexible hose whose extremity is slipped over the nipple 305, the suction line being under the control of a relief valve 327, see also Figure 5, which will be later described. In the operation of the suction wheel, relatively low vacuum is adequate since its effect is increased due to the provision of the dual suction openings 317 and 318 which act in unison. Since the suction line is closed by the solid sides of the wheel except when feed is actually occurring, a full vacuum effect, as determined by the setting of the relief valve, exists up to the wheel during non-feeding intervals. This means that the full vacuum effect is available as soon as feed begins so that there is no lag in the sheet-engaging action.

When the machine is to be fed by hand, the hose 326 can be slipped from the nipple 305 and pulled out of the way and then shaft portion 289 can be uncoupled and removed, in the manner previously described, together with the feed wheel.

In automatic feed, the wheel is driven from a gear 327' fixed on the outer end of shaft 283.

Journalled between the side walls somewhat above the inner end of the stack is a shaft 328 held by stop collars against axial displacement. Splined on the shaft is a hub 329 which is disposed between fingers 330 and 331 which project forwardly from yoke 297 and are forked so as to partially surround shaft 328 as particularly shown in Figure 31. These fingers prevent tilting of yoke 297 about shaft 289 and when the yoke and wheel are adjusted in either direction along shaft 289 the fingers enforce similar movement of the hub. Fixed on hub 329 is a spring finger 332 which projects forwardly and downwardly and is upwardly hooked at its free end. At the left-hand end of shaft 328 an arm 333 is fixed thereto and carries a roller 334 in the path of a cam 335 fixed on shaft 283, the cam being circular except for a flat 336. When the roller 334 is on the circular portion of the cam as in Figure 33, finger 332 is held clear of guide plate 277, but when the flat reaches the roller, a compression spring 337 connected between arm 333 and a lug 338 on side wall 80 acts to rock shaft 328 and thus swing finger 332 toward plate 277 and into contact therewith if no sheet is on the plate. If a sheet is on the plate, it is engaged by the finger and the latter flexes somewhat with a propelling effect on the blank and also with a polishing effect on the contacting part of the finger. The finger serves as a switch member in conjunction with plate 277, the two being in a control circuit which will be later described.

*Sheet separating means*

The bend between apron 276 and guide plate 277, Figure 39, is provided with numerous transverse slots 339 extending throughout the radius of the bend, and inside the bend is disposed a pipe 340 whose ends are received in openings in the side walls as indicated in Figures 3, 5 and 6, the pipe being located by suitable stop collars and being provided with transverse slots 341 substantially behind, and somewhat narrower than, the slots 339. The left-hand end of the pipe is plugged and its right-hand end, outside of side plate 81, is bent to provide a handle 343 to which is connected the end of a flexible hose 342 which extends from pipe 266 beyond valve 267 and across the machine. The hose has sufficient slack to permit handle 343 to be swung somewhat for the angular adjustment of pipe 340 whereby to vary the sheet separating effect of the discharge through slots 341 and 339. The pipe has sufficient friction in its side wall bearings so that it retains any adjusted position. In hand feeding, the separator is, of course, not required and the pressure supply to it is shut off when valve 267 is closed for the purpose of cutting out the stack lift and control mechanisms.

*Feed rollers and paper stop*

Referring particularly to Figures 2 and 34 to 40, plate 277 is provided with a transverse slot 344 through which projects somewhat the top portion of a lower feed roller 345 which is mounted on a shaft 346. The shaft is journalled in removable bearings 347 and 348 set in side plate openings whose diameter is greater than that of roller 345, and on its left-hand projecting end is fixed a pinion 349 beyond a spacer 350, the shaft being driven clockwise, Figure 2, through the pinion. A stop collar 351 is fixed to the other end of the shaft outside the bearing 348. Beyond roller 345 the end of plate 277 is bent upwardly and over and is provided with a slot 352 at least as long as roller 345, the lower edge of the slot being flush with the flat top surface of plate 277. The upper extremity 353 of the bent-up portion acts as a sheet deflector.

A rectangular block 354 is secured against the inside of side plate 81 by means of cap screws 355 and 356 which pass through vertically aligned slots in the side plate. Beneath the lower slot a bore in the side plate receives a pin 357 having fixed thereto an eccentric disc 358 in engagement with the lower end of block 354. The outer end of pin 357 is threaded for a lock nut 359 and the other outer extremity of the pin is kerfed for a screw driver. By loosening screws 355 and 356 and turning pin 357, an exact vertical adjustment of block 354 is securable. Fixed to the block is an inwardly projecting stud 360. Disposed against the inner side of side plate 80 is a block 361 exactly like block 354 and adjustable in the same manner, block 361 mounting a stud 362 in alignment with stud 360.

Reference numeral 363 designates a U-shaped frame having a cross portion 364 and rearwardly projecting arms 365 and 366 which are pivoted on studs 360 and 362, respectively. Above roller 345 an upper feed roller 367 is rotatably supported by arms 365 and 366. The frame 363 is pulled downwardly by springs 368 and 369 whose arrangement is most clearly shown in Figure 40, and the lower forward edge of cross member 364 is beveled at 370 to provide a sheet deflecting surface.

Secured to the inside of arms 365 and 366 on their pivoting axis are downwardly extending blocks 371 and 372 and supported in aligned bores in the lower portions of these blocks are trunnion members 373 and 374 supporting a stop member 375 which comprises a flat top portion 376 and a downwardly bent flange 377 which normally lies just behind the slot 352 and is curved on the trunnion axis. The stop is urged upwardly clockwise to this position by a torsion spring 378 which surrounds trunnion member 373 and has one end fixed to the latter and the other to block 371. Stud 360 has a reduced extension on which is pivoted a two-armed lever 379. The extension is provided with an annular groove 380 into which projects the end of a screw 381 threaded radially in the hub of lever 379 so that the latter is freely rockable but is maintained against axial displacement. One arm 382 of lever 379 carries a roller 383 cooperable with a wedge-shaped block 384 on the forward margin of portion 376 of the stop member. The other arm 385 of the lever carries a roller 386 which is in the path of cam 140, and a torsion spring 387 which surrounds stud 360 has one end secured to the latter and the other to the lever so that roller 386 is urged against the cam, the force of spring 387 being considerably greater than that of spring 378. Arm 365 has a rearward extension 388 which supports a roller 389 in the path of cam 140, the roller being held against the cam by springs 368 and 369.

With rollers 386 and 389 both on the curved part of cam 140 as in Figure 37, roller 367 is spaced above roller 345 and the stop 375 is in the normal position, previously mentioned, wherein it blocks slot 352 and arrests the sheets as fed by the suction wheel or by hand. Deflector portion 353 extends sufficiently above the bottom of roller 367 to the rear thereof as to prevent the sheet from escaping between the deflector portion and roller. However, as soon as the flat 147 reaches roller 386, lever 379 is swung counter-clockwise by spring 387, thereby swinging the stop member downwardly, against the force of spring 378, with accelerated action due to the rise of the wedge formation 384 as engaged by roller 383. When the center of the flat reaches roller 386 as in Figure 38, the stop has been swung to its outer limit and the top surface of portion 376 is at least in the plane of the top surface of plate 277, but preferably the leading edge of portion 376 is swung somewhat below this plane, as shown. The flat reaches roller 389 immediately after roller 383, and after a short travel, frame 363 is sufficiently swung by springs 368 and 369 as to bring roller 367 against the sheet which overlies roller 345. Since the stop 375 by this time is out of the way, the sheet is fed into the gripper which at this point is open, as previously described. Accurate timing of the roller feed and stop action is obtainable by adjusting cam 140 relative to the main cylinder.

*Desensitizer*

Referring to Figures 2 and 42 to 46, a shaft 390 is shown supported at one end in a bearing 391 on the inside of wall 80 and at the other in a bearing carried by a bar 392 which bridges an opening 393 in side wall 81 and has apertures for receiving studs 394 and 395 projecting from wall 81 and having threaded thereon retaining nuts 396 and 397. Fixed on shaft 390 are gears 398 and 399 of which the former has hub portions 400, 401 and the latter similar portions 402, 403. The portions 401 and 403 are spaced apart a distance somewhat greater than the length of the main cylinder, and are engaged in apertures in the end walls 404, 405 of a trough 406 for the support of the latter. A rod 407 has one end supported in a socket 408 on wall 80 and its other in an opening in bar 392. The rod passes beneath trough 406 and is secured to the bottom of the latter by straps 409 and 410 so that the trough, which is generally circular about the axis of shaft 390, is held in a somewhat forwardly tilted position. The top edges of the trough side walls are arcuate about the center of shaft 407.

Between hub portions 401 and 403 shaft 390 is flattened on one side, as clearly appears in Figures 43, 45 and 46, and is engaged in the bottom of a spring channel 411 which is curved about the round portion of the shaft and is flattened at 412 to flatly engage the flat side of the shaft. The channel includes side walls 413 and 414 of which the latter is shorter than the former, and the longitudinal edges of the walls are provided with inwardly directed teeth 415 and 416. Engaged between the channel side walls or jaws and gripped by the teeth is a wick 417 here shown as comprising a plurality of side-by-side strips. The wick projects slightly beyond the edge of side wall 413 and its length is at least as great as that of the main cylinder.

A torsion spring 418 wound about shaft 390 outwardly of bar 392 has one end engaging with the latter and the other with the shaft. The spring, acting clockwise, Figure 43, holds the wick adjacent the forward edge of the trough and preferably above desensitizing liquid in the trough, the liquid level being, for example, at *l*, Figure 43.

Reference numeral 419 designates a cover which is arcuate on the center of shaft 407 and normally overlies the top edges of the trough with slight clearance. The cover has an extension 420 bent under the trough and provided at its ends with ears 421 and 422 which are apertured to receive shaft 407 as a pivot, spacer plugs 423 and 424 being provided between the ears and the trough end walls, Figure 42. The sides of the cover are notched, as indicated at 425, Figure 43, and 426, Figure 44, to provide teeth which are engaged by ears 398 and 399 respectively.

Fixed on shaft 390 outwardly of spring 418 is a pulley or drum 427 which has wound thereon a cable 428 which is led away forwardly at the top of the pulley and is connected to one end of a normally fully collapsed coil spring 429, Figure 5, whose other end is in connection with a cable 430 running through a flexible sheath 431. Spring 429 is stronger than spring 418. Reference numeral 432 designates an angle having one leg secured in vertical relation to the outer side of the side plate 81 with the other leg projecting laterally to provide the control panel 99. One end of the sheath is secured to the panel behind an aperture in the latter, while the other end of the sheath is suitably supported from the side wall. Cable 430 extends through the panel aperture and is connected to a knob 434.

Fixed on shaft 390 outwardly of gear 398 is an arm 435 which carries a roller 436 in the vertical plane of the left-hand cylinder cam 148, the arm projecting downwardly in the normal position of parts shown in Figure 43.

With a new plate clamped on the plate surface of the cylinder, its head end will be somewhat forward of the desensitizing device since the operator will engage the tail clamp with the plate when the clamp is at its uppermost position. Before starting the machine after mounting the plate, the operator pulls out on knob 434 thereby simultaneously swinging the wick through the desensitizing fluid and retracting the cover so as to permit upward projection of the wick from the trough, and bringing roller 436 against the periphery of cam 148. Assuming that the roller comes into contact with the cam at the start of the low portion of the latter, the wick will be positioned so that its upper edge portion will lightly wipe the plate immediately the machine is started to drive the cylinder. In Figure 45 the wick is shown in wiping position with the high portion of the cam approaching, and when this portion reaches roller 436, Figure 46, shaft 390 will be rocked against the force of spring 429 and against the pull of the operator to swing the wick away so that it will not contact the impression surface of the cylinder. If the pull is maintained on knob 434, the wick will again swing into wiping position as the plate passes. Upon releasing the knob, spring 418 will return the parts to the position of Figure 43.

The side wall opening 393 is large enough so that by uncoupling cable 428 and removing nuts 396 and 397 the entire desensitizing unit can be withdrawn through it. If it is necessary to replace the wick it is readily released from the channel member 411 by holding the latter and turning shaft 390 so that the flat surface of the shaft wedges the jaws apart. For filling the trough, an elbow 405' extends from side wall 405 below the level *l* and upwardly to a point above that level. It will be known that the correct level exists in the trough when a certain level shows in the elbow.

*Blanket roll*

Referring particularly to Figures 5, 47 and 48, the blanket roll comprises a metal cylinder 437 at least as long as the main cylinder with plugs 438 and 439 pressed in its ends, the plugs having central bores 440 and 441 aligned with a tube 442 which extends between the plugs and is held in any suitable manner, as by positioning lugs 443 and 444 on the plugs. Cylinder 437 has bonded thereon a full cylindrical covering 437' of rubber or equivalent material. The surface of the covering is ground to the finish and exactness required in off-set printing blankets and the thickness of the covering in relation to its hardness is such as to minimize stretching and injury to the covering due to contact with blanks which have uneven thicknesses, for example, envelopes.

Extending through the plugs is a shaft 445 having co-axial end portions 446 and 447 and an intermediate eccentric portion 448. The end portions of the shaft are received in roller bearing assemblies 449 and 450 in enlargements of the plug bores.

Reference numeral 451 designates a bracket or hanger pivoted at its lower end to the side wall 80 by means of a shoulder screw 452 with a spacer 453 between the bracket and the side wall. At its intermediate portion the bearing has an outwardly directed hub 454 which is received with freedom of movement in a side wall opening 455, the hub being bored to provide an outer race for roller bearings 456 which support the end portion 446 of the shaft. The bracket has an expanded inner surface around its bore engaged by a spacer 457 set slightly in the adjacent face of plug 438. At its upper end the bracket carries a roller 458 mounted on a screw 459 which is radial to the pivot screw 452, the roller engaging wall 80 and spacing the bracket therefrom, the same as spacer 453. A spring anchor 460 is engaged with the extremity of screw 459 and has engaged therewith one end of a tension spring 461 whose other end is engaged with a pin 462 on the side wall in advance of the bracket. Threaded through the upper portion of the bracket parallel to the side wall is a screw 463 whose left-hand end, Figure 48, is pulled by the spring against an abutment 464 on the side wall. The screw is provided with a lock nut and its right-hand end is kerfed for a screw driver.

Pinned to shaft portion 447 is a collar 465 whose radius is greater than the eccentricity of the eccentric portion 448, the collar being supported through roller bearings 466 in the bore of the hub portion 467 of a bracket 468. This bracket, except for its hub portion, is the same as bracket 451 and is pivoted on a screw 469 in alignment with screw 452, its adjustable abutment screw 470 being pulled by a spring against a stop lug, the same as lug 464, on the inside of wall 81. Hub 467 has an outwardly projecting portion received with freedom of movement in an aperture in wall 81 and has an inwardly projecting portion bearing against a spacing washer 472 carried by the adjacent plug 439. Just outwardly of hub 467 the shaft end 447 is provided with an annular groove 473 engageable by the hooked end 474' of a latch 474 pivoted on the outside of hub 467, the latch permitting free rocking of the shaft but preventing its longitudinal displacement.

Secured to the outside of wall 81 are upper and lower rotary solenoids 475 and 476 with the plane of their axes intersecting the axis of shaft 445. Reference numerals 477 and 478 designate discs constituting the solenoid armatures. When the solenoid coil is energized its armature is attracted and is caused to rotate through a certain angle by means of balls between the housing and the armature engaged in inclined tracks of the latter. In Figure 47 the upper solenoid is de-energized and the lower solenoid energized. Projecting from armature 477 is a pair of headed pins 479 and 479', Figure 5, which are at equal distances from the armature axis and on the same diameter, which diameter at the position of mid-throw of the armature is substantially perpendicular to the axial plane of the two armatures. Armature 478 is similarly provided with a pair of pins 481 and 482 and the two sets of pins are engaged in openings in the ends of links 483 and 484 to provide a parallelogram arrangement. Midway of their ends the links are provided with opposed slots 485 and 486, Figures 49 and 49a, each of which extends perpendicularly with respect to the longitudinal axis of its link.

Fixed on shaft 447 outwardly of the links is the hub portion of a lever which includes oppositely extending arms 487 and 488, Figure 5, and pins 489 and 490, Figures 49 and 49a, which project inwardly from the arms are equally spaced from the shaft axis on the same diameter and carry rollers received in slots 485 and 486, respectively. The heads of pins 479, 479' and 481, 482, overlying the links, prevent the latter from disengaging the pins which have sufficient clearance to permit relative tilting of the links as the armatures move oppositely in and out. The heads of the pins hold the links out of contact with arms 487 and 488. The links are prevented by the armatures from movement free of the rollers on pins 489 and 490, and slots 485 and 486 are deep enough to permit some movement of shaft 445 fore and aft of the machine and to permit the links to move toward and away from each other. As here shown, the distance between pins 479 and 479' is the same as that between pins 489 and 490 so that the throw of shaft 445 is the same as that of the armatures. By varying these distances any desired relation of throws can be obtained.

Solenoid 476, being energized, has turned a certain angle counter-clockwise, Figure 5, and through the links and lever has rocked shaft 445 so that the eccentric portion 448 extends downwardly thereby holding the blanket roll in off position with respect to the plate P, Figure 48. This position will be maintained as long as the solenoid remains energized. As will be later described, means are provided for causing the de-energization of solenoid 446 and the energization of solenoid 475, and when this occurs, armature 477 is rotated clockwise and returns shaft 445 so that the eccentric portion 448 extends toward the main cylinder substantially symmetrically with respect to a radius of the latter for operatively contacting the roll with the plate as determined by the adjustment of stop screws 463 and 470. In this position the plane which includes the axis of shaft 445 and that of pivot screws 452 and 469, is substantially perpendicular to a plane which includes the axis of shaft 445 and the cylinder axis. The axial plane of solenoids 475 and 476 is substantially coincident with the first-mentioned of the said planes.

Fixed on plug 438 is a ring gear 491 which, in the operation of the machine, is at all times engaged with the cylinder gear 149, the pitch circle of gear 491 being substantially the diameter of the blanket roll so that the latter has substantially the same peripheral speed as the plate or master on the cylinder. Since the blanket roll has a continuous peripheral surface the image can be located on any segment thereof. In order to provide for uniformity of wear, the image-bearing area can be changed from time to time. This is accomplished merely by pulling the roll away from the cylinder to unmesh the gears, turning it somewhat relative to the cylinder, and then letting it back in.

To remove the blanket roll, it is merely necessary to release latch 474 from groove 473, pull shaft 445 through the large opening of hub 467 while holding the roll, and then lift out the roll. Tube 442 is provided merely for the purpose of guiding the shaft end into the opening of plug 438 in assembly.

*Blanket roll cleaner*

Referring to Figures 2, 48 and 50 to 57, reference numeral 498 designates a shaft journalled in side plate bearings 499 and 500 and projecting outwardly of plate 80, the shaft being to the rear of and at the bottom of the blanket roll. Reference numeral 501 designates a box comprising upper and lower portions 502 and 503 connected by a hinge 504. The lower forward edge of the box has downwardly projecting bearings 505 and 506 which receive and are keyed to shaft 498. Pivoted on shaft 498 between bearings 499, 505 and 500, 506 is a pair of arms 507 and 508 which at their free ends are provided with open transverse slots as at 509 which overlie slots as at 510 in the end walls of the lower housing portion 503, slots as at 511 extending from the front ends of the slots as at 510 to the upper edges of the end walls of the lower portion 503.

A roller 512, which is at least as long as the blanket roll, is disposed in box 501 and has journals 513 and 514 which project through the end wall slots and are received and supported in the slots of arms 507 and 508. Tension springs 515 and 516 connect arms 507 and 508 with forwardly disposed pins on the lower box portion so that normally the axles 513 and 514 are pulled against the forward ends of the box slots as at 510 with the roller projected somewhat through an opening 517 at the front of the box with slight clearance between the roller and all edges of the opening. The upper ends of the arms normally rest against stop pins 518 and 519 which project from the side walls so that roller 512 is spaced from the blanket roll 89 as in Figure 50.

Extending along the lower rear corner of the box is a tube 520 whose ends are closed by plugs as at 521, Figures 55 and 56, which are engaged by screws passed through the box end walls. At its top, the tube is provided with a longitudinal slot 522 and the plugs as at 521 are provided with diametrical grooves as at 523, Figure 56, which register with the slot. Reference numeral 524 designates a spring clip which holds a wick 525. The clip with the wick therein is insertable into tube 520 through the slot 522 with its ends received in the grooves as at 523 which maintain the clip in diametrical relation to the tube, the clip being somewhat squeezed against the wick. The clip has bottom perforations as at 526, Figures 55 and 57, which permit access of cleaning fluid in the tube to the wick.

In advance of tube 520, a pair of angles 527 and 528, are secured to the bottom of the box in back to back relation and between them support a flexible squeegee blade 529 parallel to tube 520.

Fixed to the projecting end of shaft 498 is an upwardly extending arm 530 to the end of which is connected a cable 531, Figure 6, which runs over pulleys 532 and 533, supported in brackets on the outside of wall 80, and through an opening in the left-hand control panel 98 to a knob 535. When the blanket roll is to be cleaned, solenoid 476 is first operated in a manner to be later described to move the roll to off position with the machine running. By pulling on knob 535, shaft 498 is rocked counter-clockwise and swings box 501 toward the blanket roll, roll 512 being carried along through springs 515 and 516. In Figure 51, roll 512 has been brought into contact with the blanket roll so as to be rotated by the latter, and when shaft 498 is now further rocked, box 501 swings relative to roll 512 so that first the applicator wick 525 comes into contact with the cleaning roll and then the latter is engaged by the squeegee blade, Figures 48 and 52. When knob 535 is released, gravity carries the cleaning roll and box back to the position of Figure 50 wherein wick 525 and blade 529 are clear of the roll. In order to remove the latter for replacement or repair, cover plate 502 is opened, arms 507 and 508 are swung clockwise to release the journals, and the latter can then be moved out through the slots as at 511.

*Moistening devices*

Referring in particular to Figures 1 to 7 and 58 to 61a, reference numerals 540 and 541 designate identical bearing hangers very similar to those provided for the blanket roll. Hanger 540 appears in outline in Figure 58 and comprises a lower portion pivoted on a pin 542 to side wall 80 through a spacer. The intermediate portion of the hanger includes a bearing hub 543 which projects outwardly of side wall 80 through an opening 544 which permits swinging of the hanger about pin 542. The upper end of the hanger mounts a spacing roller 545 on a pin 546 which projects above the roller and has connected thereto one end of a tension spring 547 which extends rearwardly and has its other end engaged with a pin 548 on the side plate. Hanger 541 has a hub 549 projecting through an opening in side wall 81 and is pulled rearwardly in the same manner as hanger 540. The aligned bores of hubs 543 and 549 receive a shaft 550 which, near its right hand end, has a radially projecting pin 551, Figure 61, receivable in a bayonet slot 552 of hub 549 and normally yieldingly retained in locked relation in the latter by means of a ball detent 553.

Rotatably mounted on shaft 549 through roller bearings 554 and 555, Figure 59, is a hollow shaft 556 which, at its ends, carries anti-friction spacers engaging the inner faces of the hangers. Fixed on the central portion of shaft 556 is a rubber roller 557 which has a covering 558 of molleton, or the like, providing a moistening form roller 559 which is at least as long as the cylinder. Fixed to shaft 556 outwardly of the roller are circular cams 560 and 561 having a slightly greater diameter than the form roller and constituting followers for the cylinder cams 148 and 139 respectively. Outwardly the cam discs are shouldered in identical manner and on the outer extremity of cam disc 560 is fixed a gear 562 whose pitch diameter is the same as the diameter of the form roller, the gear at all times engaging the main cylinder gear 149.

Journaled in side wall bearings just to the rear of roller 559 is a shaft 563 whose outwardly projecting ends have fixed thereto forwardly and parallelly extending arms 564 and 565, Figures 6 and 5, whose outer portions are provided with longitudinally extending parallel slots 566 and 567. Referring to Figure 6, reference numeral 568 designates a somewhat forwardly and upwardly inclined bar disposed inwardly of arm 564 and at its upper end carrying a roller 569 engaged in slot 566. The upper rear portion of bar 568 is slidably supported in a groove of a block 570 which lies against side plate 80 and is supported with some capability of vertical tilting on a screw 571 threaded in a lug 572 which projects from the side plate, a lock nut on the screw cooperating with the rear face of the lug. The lower rearward end of bar 568 is supported by a block 573 which is the same as block 570 and mounted in the same manner. The forward intermediate portion of the bar is slidingly received in a groove of a block 574 and a rearward slot of block 574 generally perpendicular to bar 568 receives a stud 575 projecting from the side plate and having threaded thereon a clamping nut 576. Bar 568 is thus adjustably mounted for longitudinal reciprocation as enforced by swinging of arm 564. In Figure 6, the bar is in its lower limit position and hub 543 of bearing hanger 540 will bear against the rectilinear forward edge of the bar when the low parts of the cylinder cams are passing followers 560 and 561. Below the point of engagement by hub 543, bar 568 is provided with a cut-out 577 which has arcuate ends and an intermediate flat.

Referring to Figure 5, a bar 578 like bar 568, except for a lower extension which carries a roller 579, is similarly guided for reciprocation by blocks 580, 581 and 582 which are the same as blocks 570, 573 and 574, respectively, the bar carrying at its upper end a roller 583 engaged in the slot 567 of arm 565. The hub 549 of hanger 541 is shown opposite a rectilinear portion of bar 578 just above a cut-out 584 like cut-out 577. Under these circumstances, the hangers are in a forward position in which roller 559 is spaced away from the surface of the main cylinder and can contact neither a sheet nor a plate carried by the cylinder. However, if arms 564 and 565 are swung upwardly a certain distance, the cut-outs 577 and 584 of bars 568 and 578 come behind the hub portions and the hanger springs will pull the hangers rearwardly so that roll 559 will engage a plate on the plate surface of the cylinder as permitted by the low portions of cams 140 and 148, the high portions of the cams swinging the hangers forwardly so that the roller will adequately clear the impression surface of the cylinder. The function of the cylinder cams and the followers is to swing roller 559 away from the cylinder when the impression surface is passing and to permit the engagement of the roller with the plate while the latter is traveling past. The followers do not ride on the low portions of the cylinder cams and, consequently, roller 559 engages the plate with a pressure determined by the force of the hanger springs as limited by the fore and aft adjustment of bars 568 and 578 which serve as stops. The diameter of followers 560 and 561 is enough greater than that of the form roller so that when the followers are on the high parts of the cylinder cams the form roller will be driven thereby at the same peripheral speed at which it is driven through gear 562 when the low parts of the cylinder cams are passing the followers, thereby eliminating slippage of the followers on the high parts of the cams and consequent excessive wear.

Mounted on the outside of side wall 81, Figures 1 and 5, is a bracket 585 which supports the coil portion of a rotary solenoid 586 in coaxial relation with shaft 563. The armature 587 of the solenoid has fixed thereto a stem coaxial with shaft 563 and extending through the central opening of the coil and an opening in bracket 585, the adjacent ends of the shaft and stem being joined through a coupling 589, Figures 1 and 3, which permits axial movement of the armature but transmits rotary movement of the latter positively to shaft 563. The coupling may be of the simple pin and slot type.

When solenoid 586 is energized, shaft 563, Figure 5, is rocked clockwise, and its arms act to lift bars 568 and 578 against adjustable upper stops as at 590 so that the cut-outs 577 and 584 come behind hubs 543 and 549 and permit the hanger springs to pull roll 559 toward the cylinder. The solenoid remains energized during the normal operation of the machine, and when the solenoid is de-energized and followers 560 and 561 are on the high parts of the cylinder cams, shaft 563 is returned by a torsion spring 591, Figure 2, which has one end fixed to shaft 563 and the other to wall 80, bars 568 and 578 being thus moved downwardly against adjustable lower stops as at 592, Figure 6, so that the hanger hubs are opposite the flat portions of the bars above the cut-outs as in Figures 5 and 6. The means for controlling the action of the solenoid will be later described.

Fixed in side wall 81 in advance of shaft 550 and parallel thereto is a bearing 593 in which is journaled a hollow shaft 594 which projects beyond the bearing in both directions. Fixed on the outer end of the hollow shaft is a stop collar 595 and beyond this a pulley 596 adapted to drive the shaft counterclockwise, Figure 5, through pawl and ratchet mechanism 597. A stop collar 598 fixed on shaft 594 inwardly of the bearing includes a knurled disc 599. Threaded (left hand) on the inner end of shaft 594 is a disc or header 600 to which is secured one end of a foraminate cylinder 601 which may be made, for example, of woven screen. The other end of the cylinder is secured to a disc or header 602, and the cylinder extends throughout the length of roller 559.

Frictionally supported in an opening of wall 80 and in co-axial relation with shaft 594 is a tube 603 which projects in both directions from the wall. The inner end of tube 603 is threaded and is coupled with the threaded end of a co-axial tube 604 through a tongue and groove joint and a sleeve nut 605. Tube 604 projects freely through a central opening of disc 602 to provide a bearing for the latter, and inwardly of the disc a disc or header 606 is secured to the tube. Disc 606 is secured in one end of a cylinder 607 in whose other end is secured a disc 608 having a journal portion 609 received in tube 594. Toward roller 559, cylinder 607 is perforated along a generatrix, there being, as here shown, a multiplicity of small perforations 610, the cylinder being otherwise imperforate. Fixed to tube 603 just inside of wall 80 is an upstanding arm 611 by which the tube may be rocked for the purpose of angularly adjusting cylinder 607. A flexible hose 612 leads from pipe 266 in advance of valve 267 and is in connection with the outer end of tube 603.

Reference numeral 613 designates a housing for the form roller and the screen roll, this housing comprising a lower pan portion 614 and a cover portion 615, portion 614 being supported on a plate 616 which extends between the side walls. The housing is split substantially in the common plane of the axis of shafts 550 and 594, cut-outs being provided in the end walls for the shafts and cooperating with the shafts to position the housing on plate 616. The upper margin of portion 614 is somewhat outwardly offset so as to flushly receive the lower margin of the cover portion and at its rearward end, the lower portion has an opening 617 through which the lower rearward portion of roll 559 projects for engagement with the plate. The forward wall of the housing is cylindrical about the axis of shaft 594 and in this zone the cover portion is provided with a number of vertically extending parallel slots 618 which appear most clearly in Figures 3 and 4. Semi-cylindrical baffle portions 619, equal in number to the slots 618, extend around the cylindrical housing portion on the inside thereof and secured to each is a bolt 620 which projects through a slot 618 and has a thumb nut 621 threaded on its outer end and bearing against a rubber washer 621'. One lateral edge of each baffle portion 619 is offset so as to overlie an edge of the adjacent baffle portion to provide a continuous baffle.

The pan 614 contains a repellent liquid at such a level I' that the lower portion of the screen roll dips therein, Figure 58.

In the operation of the machine, the screen roll is driven counter-clockwise, Figure 58, through pulley 596 and the upwardly moving portion of the screen carries a certain quantity of the repellent which fills the interstices. Pressure introduced into cylinder 607 jets through the perforations 610 and blows the repellent from the screen as a spray or mist over the horizontal top edge of a baffle 619' and onto the adjacent surface of roll 559. The baffle 619' rises from the pan bottom and has a notched lower edge to permit flow from side to side. The jet direction is controllable by rocking cylinder 607 through arm 611 and the moisture transfer can thus be varied since the lower part of the jet can be directed downwardly so as to be intercepted to the desired extent by baffle 619'. The baffle portions 619 are shown in normal position in Figure 58 in which their upper edges are aligned above the jet. However, by loosening clamping nuts 621, the baffle portions can be pushed around clockwise so as to intercept the jet to the required extent, the nuts being then tightened. Or if it should be desired to moisten only a portion of roller 559, one or more of the baffle portions can be pushed around far enough to overlap baffle 619', as shown in dotted lines, so as to completely intercept the jet in the zone or zones where moisture is not required. If desired, a flexible flap 622 can be fixed beneath the cover top wall with its free rearwardly extending portion wiping roll 559 for the uniform distribution of moisture thereon.

Since the screen roll is normally rotated at a constant speed with relation to the form roller and the main cylinder, and since the screen roll brings an always constant supply of moisture in front of the air jet, an extremely uniform moistening effect is secured. When starting the machine, it may be desirable to speed up the moisture supply and in that case, the operator reaches in and spins the knurled disc 599 as permitted by the pawl and ratchet drive 597, so that the repellent is delivered at an accelerated rate in front of the air jet.

With the cover removed, shaft 550 can be pulled out and the form roller removed. The screen cylinder can be removed by threading nut 605 completely onto tube 604, loosening stop collar 598, and threading shaft 594 out of disc 600.

*Inking devices*

Referring to Figures 1 to 3, 5 to 7 and 62 to 65, reference numerals 623 and 624 designate bearing hangers pivoted at their upper ends to the side plates by means of aligned screws 625 and 626. Hanger 623 appears in section in Figure 62a and in outline in Figure 63 and will be seen to comprise an intermediate hub portion 627 which projects with swinging clearance through an opening 628 in side plate 80. At its lower end, the hanger is equipped with a pin 629 engaged with a tension spring 630 which extends rearwardly to anchorage on the side plate. Hanger 624 is exactly like hanger 623 and has a bearing hub 631 aligned with hub 623 and projecting through an opening in side plate 81. The hubs support a shaft 632 which may be separably connected to one of the hubs by a bayonet joint such as that described with reference to Figures 61 and 61a.

Rotatable on shaft 632 through roller bearings as at 633 is a tube 634 having a rubber covering 635 to provide an ink form roller 636 at least as long as the main cylinder, the roller being axially positioned through contact of the ends of tube 634 with the hangers. Fixed on tube 634 at the ends of the covering 635 are circular cams 637 and 638 of slightly greater diameter than roll 636 and constituting followers for the cylinder cams 148 and 139 respectively. The cam discs are outwardly diminishingly shouldered and on the outer portion of disc 637 is fixed a gear 639 which is always in engagement with the cylinder gear 149, the pitch diameter of gear 639 being the same as the diameter of the form roller. Hubs 627 and 631 are shown in Figures 6 and 5, opposite rectilinear portions of bars 568 and 578, respectively, just above arcuate cut-outs 640 and 641. This means that roller 636 is being held away from the main cylinder as indicated in Figure 62, just as roller 559 is also being held away from the cylinder. When bars 568 and 578 are moved upwardly, in the manner previously described, the cut-outs 640 and 641 come behind hubs 627 and 631 permitting the hanger springs to swing the latter rearwardly whereby roll 636 is carried toward the main cylinder at the same time roller 559 is being similarly moved. When the impression surface of the cylinder is passing the ink roller, the latter is moved away by the high portions of cams 139 and 148. When the plate portion of the cylinder is passing roller 636, the hanger springs pull the roller against the plate as permitted by the low portions of the cams which are out of contact with the followers during this period so that the action of the hanger springs is limited by bars 568 and 578.

Pivoted to the side walls by means of aligned screws 642 and 643 are downwardly and forwardly inclined arms 644 and 645 which, at their extremities, have downwardly open transverse slots as at 646, Figure 63, in which are engaged the reduced ends of a shaft 647 which has a rubber covering to provide a rider roller 648 resting on the top forward portion of the form roller and movable therewith. Arms 644 and 645 are maintained in engagement with the ends of shaft 647 by gravity and also by the turning effect of the shaft which rotates counterclockwise, Figure 63, in view of the clockwise direction of rotation of the form roller.

Journaled in the side walls in front of the lower portion of roller 636 is a cross shaft 649 which has fixed thereto beyond the ends of the form roller a pair of angle arms 650 and 651 which rise from shaft 649 and then extend forwardly. At their extremities, the inner sides of the arms are recessed to provide seats for bearing blocks 652 and 653 which are secured in place by thumb screws 654 and 655, these blocks having aligned blind bores receiving the journal portions of a ductor roll 656. Fixed on shaft 649 outwardly of wall 80 is an arm 657 which at its extremity carries a roller 658 constituting a follower for cam 285 previously mentioned in connection with Figure 30 as fixed on portion 283 of the suction wheel drive shaft. During the drive of the latter, shaft 649 is rocked to move the ductor roll back and forth between a lower ink collecting position and an upper delivery position wherein it contacts the rider roller, the upward movement of the roller being effected yieldingly by a tension spring 659 connected at one end to arm 657 and at the other to an anchor on the side wall beneath the arm, Figure 63.

Secured between the side walls beneath the ductor roller is an angle providing a horizontal plate 659, the plate being slightly on the bias, for example, 3° to the perpendicular to the side walls and with its left-hand end the more rearward. Extending along the front end of plate 659 is a narrow rectilinear upstanding flange 660. A bracket 661 fixed to the outside of wall 80 supports a block 662 having an upward extension 663 supporting a horizontal bolt 664 whose axis is perpendicular to the vertical plane of the longitudinal axis of plate 659, the bolt supporting a flanged pulley 665 to the top of which the top surface of plate 659 is tangential. A bracket 666 secured to the outside of side wall 81 supports a block 667 which is split to provide arms 668 and 669 between which is received a flanged roller 670 which is mounted on a shaft 671 parallel to and at the same elevation as bolt 664. Pulley 670 has the same diameter as pulley 665 and its top is at the same height as that of pulley 665. Engaged with the two pulleys is an endless belt 672, which may be of rubber or the like, the side walls being apertured to pass the belt and the top run of the latter being supported on plate 659 and guided by flange 660.

Reference numeral 673 designates an ink fountain which comprises an end wall 674 and side walls 675 and 676, trunnions 677 and 678 projecting laterally from the end wall and being received in upwardly open bearings in the ends of extensions 679 and 680 which project to the right from arms 668 and 669. Journalled between the side walls on a shaft 681 is a fountain roller 682 which fills the space between the side walls. This roller has a radius which is equal to the radius of pulley 670 plus the thickness of belt 672, and a gear 683 on shaft 681 engages a gear 684 on shaft 671 for drive by the latter. The pitch diameter of gear 683 is equal to the diameter of roller 682, and gear 684 is a duplicate of gear 683. This arrangement gives roller 682 a peripheral speed equal to the speed of the belt. Any other size relation is possible as long as the peripheral speed of the fountain roller is substantially the same as that of the belt.

End wall 674 has a top surface which is substantially tangential to the lower portion of roller 682 and fixed against this surface by a central screw 685 is a blade 686, the blade filling the space between the side walls and having a lower rectilinear edge uniformly presented to roller 682. Desirably, screw 685 passes through a longitudinal slot of blade 686 in order to permit accurate adjustment of the latter. Threaded in wall 674 is a thumb screw 687 having a pointed end which engages the free portion of blade 686 exactly midway between its lateral edges. The fountain roller is pulled against the belt directly at the top of pulley 670 by means of a disengageable tension spring 688 which extends between side wall 675 and arm 679. By means to be hereinafter described, shaft 671 is driven counterclockwise, Figure 65, and the fountain roller 682 is driven clockwise through the gears at a peripheral speed equal to the linear speed of the belt, depositing a continuous film of ink I on the latter, the width of this film of course corresponding with the width of roller 682. As here shown, the film is substantially narrower than the belt and is disposed substantially centrally thereof. Cam 285 acts to swing ductor roll 656 into contact with this film. Flange 660, which is no higher than the thickness of the belt, takes the thrust of the ductor roller on the belt and so prevents distortion of the latter. As here shown in Figure 62, the width of the film is such that the right-hand end of the bottom generatrix of the ductor roller is at the rear edge of the film and the left-hand end of the same generatrix is at the forward edge of the film. Consequently, when the ductor roller is down, ink is uniformly applied throughout the length of the roller to a narrow longitudinal bottom zone of the roller and is then carried by the roller to the rider. It will be evident that if belt 672 extended exactly longitudinally under the ductor roller, the ink, with the ductor roller in contact therewith, would pile up at the right-hand end of the roller with no adequate application to the roller. However, with the slightly biased relation of the belt relative to the roller, e. g., 3°, ink is uniformly applied to the bottom of the latter throughout the length thereof. The fountain is made readily detachable for the substitution of other fountains with different roller widths or dispositions. Referring to Figure 62, if the roller 682 were disposed more to the rear of the machine, the ink would miss part of the left-hand end of the ductor roller and, consequently, only the corresponding part of the form roller would be inked. If roller 682 were moved forwardly relative to the belt a desired portion of the right-hand end of the ductor roller would miss the ink. If the fountain roller were narrower than that shown, both ends of the ductor roller would miss the ink film and ink could be applied only to any desired intermediate portion of the roller.

Since, in any event, the width of the blade is so narrow, it can be adjusted by a single screw, as shown, with entire uniformity and this is a feature of great value, eliminating the multiplicity of adjusting screws heretofore required and which can hardly be adjusted with uniform effect by other than a highly skilled operator.

Any excessive moisture on the top run drops from the belt as the latter goes around the foot pulley 665 and thus cannot be carried into the ink fountain. Glazing or blinding of the inking members by moisture grinding into the ink is thus practically eliminated. There is thus overcome a serious problem in offset printing.

For the purpose of cleaning the inking form roller, there is provided, Figure 2, a pan 689 slidable on side wall brackets as at 690 which, at their rearward ends, have upwardly inclined po.tions as at 691. The pan supports an upright blade 692 extending throughout the length of the form roller normally out of contact therewith. In order to clean the form roller, the operator at the front of the machine pushes the pan forward so that the front end of the latter is elevated by the inclines to bring blade 692 into contact with the roller.

Sheet stripping and receiving mechanism

Referring in particular to Figures 1, 2, 5 to 7, 9 and 19 to 21, reference numeral 693 designates a stripper plate whose ends are supported by side wall brackets, the plate inclining forwardly and upwardly from its lower end which is positioned closely to the main cylinder so as to catch the head end of the sheet as ejected from the gripper, Figure 21, the receiving edge of the plate being provided with notches 694, which appear most clearly in Figure 1, for clearing the gripper fingers 185 and 186. Somewhat forwardly of the notches, plate 693 is provided with a transversely extending slot through which projects the upper portion of a pull-out roller 695 which includes a shaft 696 whose ends are journaled in the side walls, the shaft projecting beyond the left-hand side wall and having fixed thereon a pulley 697, Figure 6. A shaft 698 has its ends received in upwardly open journals 699 and 700, Figure 1, and has slidably adjustable thereon thin-edged deflector discs 701 and 702 which freely ride on roller 695 or on a sheet passing between the latter and the discs, shaft 698 being freely movable generally vertically in its bearings. As here shown, the common axial plane of roller 695 and shaft 698 is substantially perpendicular to plate 693.

Forwardly plate 693 terminates adjacent the top of an ejector roller 703 which includes a shaft 704 journaled in the side walls and outwardly of the left-hand side wall being equipped with a pulley 705, Figure 6, in the vertical plane of pulley 697, see also Figure 3.

Aligned pivot pins 706 and 707 projecting inwardly from the side walls, Figure 1, support rearward extensions 708 and 709 at the sides of a plate 710 with the rear rectilinear edge of the latter closely adjacent the front lower portion of roller 703, the extensions being partly bent over the pins as indicated in Figure 5 so as to be releasable therefrom. Projecting downwardly from the sides of plate 710 at its forward end are wings as at 711, Figure 2, provided with slots as at 712 arcuate on the axis of the pins and through which project studs as at 713 from the side walls, the studs having threaded thereon clamping thumb nuts as at 714 which enable the plate to be supported in various angular relations to the pins as indicated in Figure 2. A plate 715, Figure 2, is adjustable longitudinally of plate 710 on the top of the latter and is secured in adjusted relation by a clamping thumb nut 716 on a bolt 717 which passes through a longitudinal slot in plate 715. At its outer end, plate 715 has an upturned stop wall 718. In Figure 3, reference numerals 719 and 720 designate adjustable side walls or guides on plate 710, plate 715 being narrow enough to permit adequate adjustment of the side walls. The front end of plate 715 is bevelled.

In the operation of the machine, the ejected sheet is guided by plate 693 between pull-out roller 695 and deflector discs 701 and 702 and is thereby driven over the upper edge of the plate into contact with ejector roller 703 which passes the sheet to the receiver 95 printed side up, as heretofore emphasized.

Driving mechanism

One end of the armature shaft of motor 83 drives pump 84 for the purposes heretofore described. Fixed on the other end of the armature shaft is a pulley 721, Figure 6, which, through a belt 722, drives a pulley 723 on a main drive shaft 724 which is suitably journaled in the side walls and has fixed thereon a gear 725 which engages the gear 148 of the main cylinder. Fixed on shaft 724 inwardly of pulley 723 is a gear 726 which engages a larger stud-mounted gear 727 which engages gear 349 on the shaft of the lower feed roller, see also Figures 34 and 40, so that the roller is driven at a peripheral speed equal to or greater than that of the main cylinder. A pinion 728 inwardly of gear 727 and fixed thereto drives a stud-mounted idler 729 of the same size which, in turn, drives gear 327' on the feed wheel shaft so that the feed wheel is driven at the same R. P. M. as the main cylinder and in properly timed relation with the latter and with the drop roll action and paper stop mechanism.

Fixed on shaft 724 outwardly of pulley 723 is a pulley 730 which, through a crossed belt 731 drives pulleys 697 and 705 so that the pull-out roller 695 and the ejector roller 703 are driven at a peripheral speed as great as or greater than that of the main cylinder.

It has previously been described how the blanket roll and the moistening and inking form rollers are driven from the main cylinder at substantially the same peripheral speed as that of the cylinder.

Ink belt 672 and the screen roller of the moistening device are driven in the following manner:

Referring to Figures 1, 3 and 5, a worm 732 is fixed on the right-hand end of the main cylinder shaft 115 and drives a worm wheel 733 splined on a shaft 734 which is supported by bearing blocks 735, 736 and 737 on the outside of side wall 81, shaft 734, as shown in Figure 1, being disposed in alignment with shaft 671 of the belt driving pulley 670, the shafts being perpendicular to the line of the belt. The worm wheel is held against axial movement by the bearings 736 and 737. An L-shaped leaf spring 738 fixed to the side wall has an outwardly projecting portion bearing against a stop collar 739 on shaft 734 and normally forcing a stop collar 740, also fixed on the shaft, against bearing 736 and thereby holding open a one-way jaw clutch which comprises a driven portion 741 on shaft 671 and a driving portion 742 on shaft 734. Clutch portion 741 is grooved to provide a pulley which, through a twisted belt 743, is adapted to drive pulley 596 on the shaft portion 594 of the screen cylinder, see also Figure 59.

A bell crank lever pivoted on a pin 744 projecting from the side wall has a horizontally extending portion 745 whose free end is slightly spaced above roller 579 of bar 578 when the latter is in its lower position. The other arm 746 of the lever projects upwardly and has connected to its upper end a cable 747 which runs through a sheath 748 to a knob 749 on panel 99. Arm 746 carries a roller 750 engageable with the flat rear surface of jaw portion 742. The illustrated pin and slot connection between arm 746 and the cable end enables the arm to be pulled counterclockwise through the cable to close the clutch and permits the arm to be moved by other means for the same purpose without pushing on the cable and displacing knob 749.

As will later be described in detail, when the starting switch is closed, the suction feeding mechanism remains inoperative and the blanket roll and the form rollers are held off until further manipulations are made. Prior to these manipulations, it is desirable to thoroughly condition the form rollers for operation and to accomplish this, knob 749 is pulled out, thereby closing clutch 741, 742 so that the screen cylinder and the ink belt are both driven and the drive may be maintained until the moistening form roller has been thoroughly moistened and the ink form roller thoroughly inked. When solenoid 536 is energized to lift bars 568 and 578 to let in the form rollers, roller 579 on bar 578 engages arm 745 of the clutch actuating lever and automatically closes the clutch and maintains it closed until the solenoid is de-energized. Enough clearance is provided between arm 745 and roller 579 to permit the hubs of the bearing hangers for the form rollers to come onto the flats of the cutouts before the clutch is energized.

Electrical system

Referring to Figure 68, reference numerals 721 and 722 designate leads from a power source to a master switch 723 which, as shown in Figure 6, is a toggle switch mounted on panel 98. Conductors 724 and 725 lead to the motor 83 and branches 726 and 727 lead to a rectifier-transformer unit 728. Consequently, when switch 723 is closed, the machine is driven and power is supplied to unit 728. A wire 729 leads from one terminal of unit 728 to a wire 730 which, through wires 731, 732 and 733 is in connection with one end of the coils of solenoids 586, 475 and 476. It is here considered that switch 723 is closed and, in that case, solenoids 586 and 475 are off while solenoid 476 is on. The rotary armature 587 of solenoid 586 carries a mercury switch 734 through which the other end of the solenoid coil is in connection with a wire 735. When the solenoid is energized, the mercury switch opens so that the connection to the coil is through a resistor 736. Solenoid 475 has a similar switch 737 in shunt with a resistor 738 which is in connection with a wire 739, and solenoid 476 has a similar switch 740 and resistor 741 in connection with a wire 742. Full power is supplied to the solenoid for the operation thereof, the resistors then being cut in for maintenance of the operated condition and serving to reduce the current so as to prevent over heating, relatively little current being required for holding purposes.

A wire 743 leads from the other terminal of unit 728 to a contact arm 744 with which is cooperable a spring switch arm 745 carrying a roller 746 which follows a cam 747 fixed on shaft 115 of the main cylinder to the outside of side plate 81, the cam having a point 748 which closes the switch upon engagement with roller 746, the switch being normally open. A wire 749 connects arm 744 with the paper guide plate 277.

A wire 750 in connection with wire 749 leads to contacts 751 and 752 of a relay 753 which includes spring arms 754 and 755 cooperable with contacts 751 and 752, respectively, and normally disengaged therefrom. The free ends of arms 754 and 755 are connected by an insulating block 756 engageable by one end 757 of a pivoted L-shaped lever whose other arm 758 constitutes an armature for a coil 759 to one end of which wire 730 is connected. Wire 730 is also in connection with one end of a coil 760 arranged to counteract coil 759 so that if the latter is energized and has attracted the armature to close the relay switches, energization of coil 760 will nullify the action so that arms 754 and 755 can spring away from the contacts. The other end of coil 760 is in connection through a wire 761 with the detector finger 332. The other end of coil 759 has a connection 762 with arm 755 and also through a wire 763 with the contact arm 764 of a switch 765, the contact arm being normally engaged by a spring switch arm 766 carrying at its free end a roller 767 following a cam 768 having a point 769, the cam being mounted on a pin 770 projecting outwardly from angle 432, Figure 5, the cam being equipped with a handle 771 which projects through a vertical slot in panel 99 between knobs 434 and 749. Switch arm 766 is in connection through a wire 772 with switch arm 745.

Arm 754 of relay 753 is connected through a wire 773 with a switch contact 774 of a switch 775, the contact being normally engaged by a spring switch arm 776 which, at its outer end, carries a roller 777 following cam 768, roller 777 being in advance of a roller 767 in the operating direction of the cam which is counter-clockwise. Switch 775 includes another contact 778 cooperable with arm 776 and normally free thereof, the contact being in connection with wire 749 through a wire 779. Arm 776 of the switch is connected by a wire 779' with a spring switch arm 780 carrying a roller 781 following cam 748 90° behind roller 746. Arm 780 is cooperable with a spring contact arm 782 to engage the latter and move it away from a contact 783 which is in connection with a contact 784 cooperable with a spring switch arm 785 of a relay 786. Another spring switch arm 787 has its free end connected to the free end of arm 785 by means of an insulating block 788 engageable by one arm of a pivoted L-shaped lever 789 whose other arm constitutes an armature for a coil 790. Arm 787 is cooperable with a contact 791 and this and arm 785 are in connection with conductor 743 through wires 792 and 793. Switch arm 782 is in connection with one end of coil 790 through a wire 794 and the other end of the coil is in connection with wire 730 through a wire 795. A conductor 796 extends from arm 787 to conductor 735 through a normally closed push button switch 797 on panel 98, Figure 6.

A spring switch arm 798 carries at its free end a roller 799 which follows cam 747 90° behind roller 781 and the arm is in connection with wire 773 through a wire 800. Arm 798 is cooperable with a spring switch arm 801 to engage and move the latter from a contact 802 which is in connection with a contact 803 of a relay 804. Arm 801 has a connection 805 to a contact 806 which is engageable by arm 766 of switch 765. Contact 803 is engageable by a spring arm 807 whose free end is connected with the free end of a spring arm 808 by means of an insulating block 809 movable by an armature 810 which is associated with a coil 811. Arms 807 and 808 have a connection 812 with wire 793. Arm 808 is cooperable with but normally free of a contact 813 in connection with wire 739 and normally engages a contact 814 in connection with wire 742. Coil 811 is in connection with wires 730 and 805 through wires 815 and 816, respectively.

When switch 723 is closed, the throw-off solenoid 476 for the blanket roll is at once energized and assumes the illustrated position, Figure 68, energization occurring due to the engagement of arm 808 of relay 804 with contact 814. When point 748 of cam 747 moves arm 745 against contact 744, coil 759 of relay 753 is energized but is counteracted as the flat 336 of cam 335 reaches the roller which controls finger 332, the latter engaging plate 277, since no paper is being fed, and energizing coil 760. With relay 753 thus inactive, no current goes to arms 780 and 798 of relays 786 and 804.

When cam 768 is turned from its first or rest position to its second position, it engages roller 777 and moves arm 776 away from contact 774 and against contact 778. Switch arm 780 will engage contact arm 782 and move it away from contact 783 when the cam point 748 engages roller 781, thereby establishing a circuit to coil 790. As point 748 passes, arm 782 engages contact 783 before it is left by arm 780 and a holding circuit is established for the coil through arm 785 which is in engagement with contact 784. Arm 787 is also in engagement with contact 791 so that a circuit is completed to solenoid 586 whereby bars 568 and 578 are lifted, permitting the form rollers to move in. The plate is thus conditioned for printing before paper is fed and with the blanket roll in off position.

When cam 768 is moved to its third position wherein point 769 engages roller 767 and moves arm 766 away from contact 764 and against contact 806, a circuit is completed to coil 811 of relay 804 when point 748 of cam 747 moves arm 745 against contact 744, and arm 808 is moved away from contact 814 and against contact 813 to de-energize solenoid 476 and energize solenoid 475 so that the latter throws in the blanket roll. Arm 807 engages contact 803 to complete a holding circuit for coil 811, and when point 748 of cam 747 engages roller 799, arm 801 is moved away from contact 802 to break the holding circuit so that coil 811 is de-energized with the result that rotary solenoid 475 is also de-energized while solenoid 476 is energized. Thus, the blanket roll is thrown in and out alternately as long as cam 768 is in its third position, being in for 180° while the plate is passing and out for 180° while the impression surface is passing, a clear image being thus built upon the blanket roll before any paper is fed. When cam 768 was moved to its third position, arm 766 re-engaged contact 774.

When cam 768 is moved to its fourth position, arm 766 re-engages contact 764 and under this condition, the holding circuit for relay 804 acts in the same manner as that provided in connection with relay 786. With the machine in normal operation, the holding circuits act to maintain solenoids 586 and 475 constantly energized, these solenoids being de-energized and solenoid 476 energized if no paper is on guide plate 277 when the detector finger 332 comes down. Arm 755 and contact 752 are in a holding circuit for coil 759.

Referring to Figure 5, opposite arms 817 and 818 project from the sides of cam 769, arm 817 having pivoted thereto one end of a link 819 whose other end is pivoted to a stem 820 fixed to a pivoted flap 821 of valve 327. Pivoted to the upper arm 818 is a link 822 which extends rearwardly and has its rear end supported on the hub of a finger 823 fixed on the detector finger shaft 328. The link is guided by a clip 824 on the side wall and is pressed downwardly by a spring 825 seated in the clip. The underside of the rearward extremity of link 822 is provided with square recesses 826 and 827, the two being separated by a short land 828. Finger 823 has a nose portion which in the number 1 position of cam 769 is in the forward end of recess 826, as shown, and the recess is long enough so that the cam can be turned into position number 3 before the land strikes the finger. However, the cam cannot be turned to the fourth position until the finger swings out of recess 826, this occurring as the detector finger is swung down. Thereupon the fourth position can be attained, the nose then engaging in recess 827 and the flap 821 closing and thereby rendering the suction wheel operative since the suction line which was previously inoperative by reason of the open valve is now closed. When the detector finger is down, the suction sector of the feed wheel is at the point of releasing, as shown in Figure 31, and when the leading orifices 317 and 318 reach bottom position, feed will begin. It is thus assured that the first feeding action of the wheel will be complete. Handle 771 cannot be moved back from fourth to third position unless the nose is out of recess 827 and this means that valve 327 cannot be opened to break the vacuum while the suction wheel is feeding.

*Operation*

With the machine at rest, the operator, for automatic sheet feeding, places a stack on table 213, the latter being in its lowered position. This table is at an inclination, here shown as 7°, whereas end guides 241 and 276 are vertical, as previously described. Consequently, when the operator places the stack on the table against the head guide and moves the tail guide against it, the sheets are all slightly displaced relative to each other so as to be loosened, and a bevel is applied to the ends of the stack, that at the head end greatly facilitating the action of the air separator. This inclination diminishes the tendency of the top sheets to crawl ahead in automatic feeding and also gives somewhat more operating room at the front of the machine. It may be mentioned that in hand feeding, the inclination limits the tendency of the manually held stack to crawl ahead.

With the table loaded, main switch 723 is closed so that the motor starts and current is also supplied to the transformer-rectifier unit, as previously mentioned. The pump is operated and pressure is supplied to the screen cylinder of the moistening apparatus and, valve 267 being open, pressure is also supplied to the air separator tube and to the bellows 211. The bellows lifts the stack up to the proper feeding height as controlled by the ball valve but the feed wheel is without effect since handle 771, Figure 5, is in its number 1 position wherein valve 327 is open. The operator next pulls out knob 749 to engage the clutch 741, 742 through which the inking mechanism and the screen cylinder of the moistening mechanism are driven. Consequently, moisture is blown onto the moistening form roller and ink is applied to the inking form roller so that the rollers are thoroughly conditioned for operation.

If the plate was not previously clamped on the plate segment, the machine is stopped and this is done. The operator then starts the machine again and pulls out on knob 434 during a few rotations of the main cylinder so that desensitizing liquid is applied to the plate.

The operator then moves handle 771 to its second position, thus moving switch arm 776 against contact 778 so that solenoid 586 becomes energized and the form rollers are moved in to contact the plate for the application of repellent and ink thereto, the blanket roll being in off position. When the plate has been thoroughly conditioned, arm 771 is moved to its third position so that switch arm 776 leaves contact 778 and re-engages contact 774 while switch arm 766 is moved away from contact 764 and into engagement with contact 806 with the result that the form rollers are moved to off position while the blanket roll is moved alternately in and out for the building up of an image thereon.

When handle 771 is now moved to fourth position, as permitted by the interlocking mechanism 822 and 823, valve 327 closes so that suction is applied to feed wheel 313 and feeding begins. When arm 771 was moved to fourth position, switch arm 766 re-engaged switch arm 764 so that switches 765 and 775 are again in the position of Figure 68 and solenoids 586 and 475 are maintained energized as previously described. However, should the feed wheel miss a sheet so that none is on plate 277 when detector finger 332 lowers, coil 760 will be energized so that the armature of relay 753 is released thereby de-energizing the coils of relays 786 and 804 so that the form rollers and the blanket roll are thrown to off position as point 748 reaches rollers 781 and 799. When bar 578 moves downwardly, roller 579 leaves lever arm 745 so that clutch 741, 742 opens, thus interrupting the drive to the ink belt and to the screen cylinder of the moistening apparatus with the important result that the form rollers are not being excessively supplied while idling. As soon as the next sheet is properly fed under finger 332, or as soon as one is initially fed thereunder, relay 753 acts to supply current to arms 780 and 798 of relays 786 and 804, since coil 760 of relay 753 remains dead, and the form rollers and blanket roll automatically move in to the cylinder and clutch 741, 742 closes.

As previously stated, movement of handle 771 to its fourth position is permitted when detector finger 332 is in its down position. While the suction line is thus completed up to the wheel due to the closing of valve 327, the wheel does not immediately begin to feed since, as previously mentioned, its suction sector is away from the stack. As the rotation of the wheel continues, finger 332 is lifted and when the leading suction orifices 317 and 318 come above the top sheet, the latter, as assisted by the air separator, is engaged by the wheel and the wheel propels the sheet along plate 277 through slot 352 and against stop 377. The last orifices 317 and 318 now disengage the sheet and the sheet is held against the stop by the action of the lower feed roll and the detector finger. Any tendency of the leading end of the sheet to rise is overcome by deflector portion 353 which extends high enough and close enough with respect to the drop roll so as to prevent escape between the latter and the top of the deflector. Stop 377 is close enough to slot 352 so that the end of the sheet can escape neither up nor down. It may be mentioned that in Figures 36 and 37, the spacing between the feed roller and the drop roller is somewhat exaggerated since in actual practice the maximum spacing between the two need be only slightly greater than the stock of maximum thickness intended to be handled by the machine. Due to the presence of the sheet on plate 277, the detector finger cannot energize the counteraction coil, or other suitable neutralizing means, for coil 759 of relay 753. As the flat 147 of cam 140 now reaches roller 386 of the stop control mechanism, the stop is lowered so that its flat plate portion 375 is brought into substantial continuation of plate 277, preferably with the receiving edge of portion 375 somewhat below the level of plate 277, as in Figure 38, so that portion 375 is at a greater angle than plate 277 to provide an enhanced deflecting action into the gripper. Hereupon, frame 363 is lowered to bring the drop roller against the paper and the feed roller then acts to propel the sheet into the open gripper. Ordinarily, the sheet is propelled at a speed greater than the peripheral speed of the cylinder so that in striking the bottom of the angle between the gripper and ejector fingers, i. e., the gripper stop, the sheet is caused to buckle somewhat adjacent its head end. This buckle is temporarily increased as the gripper closes since, in closing, the gripper is being swung counter to the direction of cylinder rotation due to the eccentric relation of the gripper stop to its swinging axis. On the other hand, when the gripper is opened at the top of its travel, it is swung in the direction of rotation of the cylinder and, hence, away from the leading edge of the paper, thereby enabling the ejector fingers to effectively throw the leading edge of the paper outwardly. The thus outthrown end of the sheet is readily caught by the stripper 693 and passed to the catcher as previously described, the bottom of the catcher being low enough with respect to ejector roller 703 to enable a substantial stack to be built up in the catcher without interference with reception.

When the job is finished, excess ink can be removed from the plate by pressing push button switch 797 so that the form rollers are moved out while the blanket roll remains in, and a few sheets are run through with the parts in this relation. Handle 771 is then swung back to its first position while switch 797 is held open, and the blanket cleaner is applied by pulling out on knob 535. The inking form roller is cleaned by pushing tray 689, Figure 2, rearwardly to engage blade 692 with the roller.

It will be understood that the operation of either or both of knobs 434 and 749 can be omitted if conditions warrant.

The adjusting means for the air cylinder and baffles of the moistening mechanism, for the air separator tube, and for the fountain blade are at all times accessible to the operator at the front of the machine.

Referring to Figure 69, the general outline of the main cylinder is indicated by the circle 830. In the machine as shown, the axis of the moistening form roller when the latter is in operative position is on a line 831 which is 34½° above the horizontal while the axis of the inking form roller is on a line 832 which is 10½° below the horizontal. The axis of the blanket roll in the on position is on a line 833 which is 15° above the horizontal.

The paper stop 375 begins to drop when the gripper is at the point 834 and the upper feed roller begins to drop when the gripper is at the point 835. At the point 836, where the top plane of plate 277 is substantially tangent to the circle, the gripper starts to close and is fully closed at the point 837 which is 10°, or somewhat more, beyond, all of these points being approximately located.

The gripper starts to open when the leading edge of the sheet is about 5° beyond the top of circle 830 at point 838 and the ejecting action starts approximately 15° beyond top center at point 839. Thus, the gripper is in holding-down relation to the head end of the sheet until the latter is approximately 90° beyond its line of contact with the blanket roll and, consequently, any danger of the sheet following the blanket roll is substantially eliminated, this being so even when printing heavy with tacky ink.

To achieve this non-following effect there should be 60° or more between the printing zone and release, and the spacing could be well in excess of 90°. However, with the illustrated position of the blanket roll, the roll is accessible to the operator, a large part of the plate is visible from above, and room is left below the roll to permit the positioning of the motor relatively close to the cylinder for the sake of compactness.

Point 840 indicates the position of the trailing edge of the impression segment when the blanket roll goes on or off, point 841 indicating the position of the leading edge of the impression segment when the blanket roll goes on or off. This point also indicates the position of the leading edge of the plate when the blanket roll goes on in initially building up the image, i. e., with handle 771 in its third position. The point further indicates the position of the leading edge of the impression segment when the blanket roll goes off in the image building operation.

Point 842 designates the position of the leading edge of the plate when the form rollers go on or off and point 843 the position of the trailing edge. The leading edge of the impression segment is at 844 when switch arm 744 closes the circuit to relay 753.

The gripper is approximately at point 845 when the flat 336 of cam 335 moves onto roller 334 so that the detector finger is swung down by spring 337, Figure 33, the parts being then in the position of Figure 31. As the center of the flat moves to the roller the finger is flexed to exert the feeding action previously mentioned.

We have hereinbefore emphasized the compactness made possible by the new design and arrangement of elements in accordance with the invention. As an illustration, the dimensions of a practical size of office machine may be: 30 inches in overall length, 16 inches in height, and 17 or 18 inches between the side plates. For best results, the machine embodies the various elements which have been specifically described, but conjoint use of these elements is not mandatory under the broad scope of the invention as defined in the following claims, and variations in the form and arrangement of all elements or groups thereof may be made.

We claim:

1. In apparatus of the class described, a frame having a front end at which an operator is intended to be stationed, a main cylinder mounted on said frame, a feed table in front of and below said cylinder, said table being inclined upwardly and rearwardly at a gradual angle, a vertical stack tail guide at the front end of the table, the angle formed between said tail guide and said table being less than 90 degrees, a fixed vertical stack head guide at the rear end of the table, the angle formed between the head guide and said table being greater than 90 degrees, said head guide and said tail guide being substantially parallel, guide means extending from the top of said head guide toward the bottom of said cylinder, means for feeding blanks from the stack and along said guide means to the cylinder, and means for elevating the table as blanks are fed from a stack thereon.

2. Apparatus according to claim 1 wherein said guide means has a guide surface whose plane is parallel to the table and is substantially tangent to the cylinder.

3. Apparatus according to claim 1 wherein means are provided for throwing out the feeding and elevating means, and including means for fixing the table in elevated position for hand feeding over said rear guide.

4. Apparatus according to claim 1 wherein the guide means includes a plate portion bent from said rear guide and the bend between the two is provided with a multiplicity of openings, and wherein an air tube is disposed behind the bend and has openings directed toward the openings in the bend.

5. An offset duplicating machine comprising a main frame including parallel side plates, providing an open space at the forward end adjacent the position of an operator, stack supporting and sheet feeding means between said side plates at the forward end thereof, a main cylinder having plate and impression segments supported for rotation on a horizontal axis between said side plates above and to the rear of the sheet feeding means, a sheet gripper-ejector at the leading end of the impression segment positioned to receive and grip a fed sheet substantially at the bottom of its circular path of movement, a blanket roll supported for rotation between the side plates at the rear of the cylinder, means for opening the gripper-ejector at substantially the top of its circular path of movement and for ejecting a printed sheet, a moistening assembly including a moistening form roll supported for rotation between said side plates at the forward side of the cylinder and an inking assembly including an ink form roll supported for rotation between the side plates at the forward side of the cylinder below the moistening form roll.

6. An apparatus in accordance with claim 5 characterized in that the blanket roll is positioned at least 60° in advance of the point of ejection of the sheet by the gripper-ejector.

7. An offset duplicating machine comprising a frame having a front end, a main cylinder supported for rotation on a horizontal axis by the frame and having plate and impression surfaces, means for rotating the cylinder so that its lower surface moves rearwardly from said end, a feed table supported by said frame in front of said cylinder, a paper sheet gripper at the leading end of the impression segment, means for feeding paper sheets rearwardly substantially tangentially toward the bottom of the cylinder and for inserting the leading edge of a sheet into the gripper when the latter is open, means for closing the gripper immediately after the same passes rearwardly beyond a vertical plane coincident with the cylinder axis, a blanket roll supported by the frame to the rear of the cylinder, means for opening the gripper to release the printed sheet immediately after the same passes forwardly beyond said vertical plane, means adjacent the front of the frame for receiving the released sheets, and a plate moistening assembly including a form roll having its axis on a radial plane of the cylinder extending forwardly and upwardly between said vertical plane and a horizontal plane coincident with the cylinder axis thereof.

8. An offset duplicating machine comprising a frame having a front end, a main cylinder supported for rotation on a horizontal axis by the frame and having plate and impression surfaces, means for rotating the cylinder so that its lower surface moves rearwardly from said end, a feed table supported by said frame in front of said cylinder, a paper sheet gripper at the leading end of the impression segment, means for feeding paper sheets rearwardly substantially tangentially toward the bottom of the cylinder and for inserting the leading edge of a sheet into the gripper when the latter is open, means for closing the gripper immediately after the same passes rearwardly beyond a vertical plane coincident with the cylinder axis, a blanket roll supported by the frame to the rear of the cyilnder, means for opening the gripper to release the printed sheet immediately after the same passes forwardly beyond said vertical plane, means adjacent the front of the frame for receiving the released sheets, and a plate inking mechanism including an ink form roll having its axis disposed on a radial plane of the cylinder extending forwardly and downwardly between said horizontal and vertical planes.

9. An offset duplicating machine comprising a frame having a front end, a main cylinder supported for rotation on a horizontal axis by the frame and having plate and impression surfaces, means for rotating the cylinder so that its lower surface moves rearwardly from said end, a paper sheet gripper at the leading end of the impression segment, means for delivering paper sheets rearwardly, substantially tangentially toward the bottom of the cylinder and for inserting the leading edge of a sheet into the gripper when the latter is open, means for closing the gripper immediately after the same passes rearwardly beyond a vertical plane coincident with the cylinder axis, a blanket roll supported by the frame to the rear of the cylinder, means for shifting the gripper to release the printed sheet immediately after the same passes forwardly beyond said vertical plane, means adjacent the front of the frame for receiving the released sheets, a plate moistening assembly including a form roll having it axis on a radial plane of the cylinder extending forwardly and upwardly between said vertical plane and a horizontal plane coincident with the cylinder axis thereof, and a plate inking mechanism including an ink form roll having its axis disposed on a radial plane of the cylinder extending forwardly and downwardly between said horizontal and vertical planes.

10. An offset duplicating machine comprising a frame having a front end, a main cylinder supported for rotation on a horizontal axis by the frame and including plate and impression surfaces, a feed table supported by said frame in front of said cylinder and disposed for the feeding of sheets to the bottom of the cylinder, said cylinder including a gripper disposed at the leading edge of the impression surface, means for opening the gripper when it is disposed at the bottom of said cylinder to engage a sheet so fed to the bottom of the cylinder, a blanket roll mounted on and supported by said frame to the rear of the cylinder, means supported by the frame at the top of the cylinder for stripping the released and printed sheet, a receiving tray adjacent the front end of the frame for receiving the released sheets, a plate moistening assembly including a form roll having its axis on a radial plane of the cylinder extending forwardly and upwardly between said vertical plane and a horizontal plane coincident with the cylinder axis thereof, and a plate inking mechanism including an ink form roll disposed on a radial plane of the cylinder extending forwardly and downwardly below the moistening form roll.

11. An offset duplicating machine comprising a frame having a front end, a main cylinder supported for rotation on a horizontal axis by the frame and having plate and impression surfaces, means for rotating the cylinder so that its lower surface moves rearwardly from said end, a paper sheet gripper-ejector at the leading end of the impression segment, means for delivering paper sheets rearwardly, substantially tangentially toward the bottom of the cylinder and for inserting the leading edge of a sheet into the gripper-ejector when the latter is open, means for closing the gripper immediately after the same passes rearwardly beyond a vertical plane coincident with the cylinder axis, a blanket roll supported by the frame to the rear of the cylinder, means for shifting the gripper-ejector to release and eject the printed sheet immediately after the same passes forwardly beyond said vertical plane, means adjacent the front of the frame for receiving the ejected sheets, a plate moistening assembly including a form roll having its axis on a radial plane of the cylinder extending forwardly and upwardly between said vertical plane and a horizontal plane coincident with the cylinder axis thereof, and a plate inking mechanism including an ink form roll having its axis disposed on a radial plane of the cylinder extending forwardly and downwardly between said horizontal and vertical planes.

12. An offset duplicating machine comprising a frame having a front end, a main cylinder supported for rotation on a horizontal axis by the frame and having plate and impression surfaces, means for rotating the cylinder so that its lower surface moves rearwardly from said end, a paper sheet gripper-ejector at the leading end of the impression segment, means for delivering paper sheets rearwardly, substantially tangentially toward the bottom of the cylinder and for inserting the leading edge of a sheet into the gripper-ejector when the latter is open, means for closing the gripper immediately after the same passes rearwardly beyond a vertical plane coincident with the cylinder axis, a blanket roll supported by the frame to the rear of the cylinder, means for shifting the gripper-ejector to release and eject the printed sheet immediately after the same passes forwardly beyond said vertical plane at a point which is at least 60 degrees in the rotation of the cylinder beyond the point of contact of the sheet with the blanket roll, and means adjacent the front of the frame for receiving the ejected sheets.

HAROLD R. GULLIXSON.
HERBERT F. BRUNS.

References Cited in the file of this patent
UNITED STATES PATENTS

| Number | Name | Date |
|---|---|---|
| 1,548,310 | Hartmann et al. | Aug. 4, 1925 |
| 1,558,686 | Lipton et al. | Oct. 27, 1925 |
| 1,576,598 | Goulding | Mar. 16, 1926 |
| 1,624,787 | Hallstream | Apr. 12, 1927 |
| 1,651,295 | Shuttleworth | Nov. 29, 1927 |

(Other references on following page)

UNITED STATES PATENTS

| Number | Name | Date |
|---|---|---|
| 1,691,336 | Casto | Nov. 13, 1928 |
| 1,707,209 | Broadmeyer | Mar. 26, 1929 |
| 1,721,608 | Swait et al. | July 23, 1929 |
| 1,843,118 | Brasseur | Feb. 2, 1932 |
| 1,989,911 | Brasseur | Feb. 5, 1935 |
| 2,036,451 | Wood | Apr. 7, 1936 |
| 2,095,498 | Hanauer | Oct. 12, 1937 |
| 2,101,202 | Stevens | Dec. 7, 1937 |
| 2,154,604 | Bradt | Apr. 18, 1939 |
| 2,165,231 | Curtis | July 11, 1939 |
| 2,231,274 | Marchev et al. | Feb. 11, 1941 |
| 2,285,224 | Nigra et al. | June 2, 1942 |
| 2,296,533 | Neal | Sept. 22, 1942 |
| 2,302,490 | Curtis | Nov. 17, 1942 |
| 2,306,044 | Davidson | Dec. 22, 1942 |
| 2,376,255 | Hunting | May 15, 1945 |
| 2,387,750 | Davidson | Oct. 30, 1945 |
| 2,421,824 | Allen et al. | June 10, 1947 |

FOREIGN PATENTS

| Number | Country | Date |
|---|---|---|
| 32,348 | France | Nov. 28, 1927 |
| 375,163 | Germany | May 7, 1923 |
| 473,524 | Great Britain | Oct. 14, 1937 |